United States Patent
Watson et al.

(10) Patent No.: US 7,395,211 B2
(45) Date of Patent: Jul. 1, 2008

(54) MODULATING ONE OR MORE PARAMETERS OF AN AUDIO OR VIDEO PERCEPTUAL CODING SYSTEM IN RESPONSE TO SUPPLEMENTAL INFORMATION

(75) Inventors: Matthew Aubrey Watson, Sugar Land, TX (US); Michael Mead Truman, San Francisco, CA (US); Stephen Decker Vernon, Hillsborough, CA (US); Brett Graham Crockett, Brisbane, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 822 days.

(21) Appl. No.: 10/344,388

(22) PCT Filed: Aug. 15, 2001

(86) PCT No.: PCT/US01/25473

§ 371 (c)(1),
(2), (4) Date: Feb. 11, 2003

(87) PCT Pub. No.: WO02/15587

PCT Pub. Date: Feb. 21, 2002

(65) Prior Publication Data

US 2004/0024588 A1    Feb. 5, 2004

Related U.S. Application Data

(60) Provisional application No. 60/256,078, filed on Dec. 15, 2000, provisional application No. 60/255,967, filed on Dec. 15, 2000, provisional application No. 60/255,964, filed on Dec. 15, 2000, provisional application No. 60/256,157, filed on Dec. 15, 2000, provisional application No. 60/255,965, filed on Dec. 15, 2000, provisional application No. 60/256,000, filed on Dec. 15, 2000, provisional application No. 60/226,151, filed on Aug. 16, 2000, provisional application No. 60/226,044, filed on Aug. 16, 2000.

(51) Int. Cl.
G10L 11/04 (2006.01)
G10L 21/00 (2006.01)
G10L 19/00 (2006.01)
G10L 19/14 (2006.01)

(52) U.S. Cl. .............. 704/500; 704/200.1; 704/206
(58) Field of Classification Search ............... 704/260, 704/200.1, 206, 500
See application file for complete search history.

(56) References Cited

U.S. PATENT DOCUMENTS 5,121,204 A * 6/1992 Cila et al. ............ 348/475

(Continued)

FOREIGN PATENT DOCUMENTS

EP    0162681 A2    5/1985

(Continued)

OTHER PUBLICATIONS

Digital Audio Compression Standard (Dolby AC-3), Document A/52, Advanced Television System s Committee, Approved Nov. 10, 1994. (Rev 1) Annex A added Apr. 12, 1995. (Rev 2) 13 corrigenda added May 24, 1995.

(Continued)

Primary Examiner—David Hudspeth
Assistant Examiner—Justin W. Rider
(74) Attorney, Agent, or Firm—Gallagher & Lathrop; Thomas A. Gallagher

(57) ABSTRACT

A method of modifying the operation of the encoder function and/or the decoder function of a perceptual coding system in accordance with supplemental information, such as a watermark, so that the supplemental information may be detectable in the output of the decoder function. One or more parameters are modulated in the encoder function and/or the decoder function in response to the supplemental information.

21 Claims, 22 Drawing Sheets

U.S. PATENT DOCUMENTS

| | | | | |
|---|---|---|---|---|
| 5,161,210 | A | | 11/1992 | Druyvesteyn et al. .......... 395/2 |
| 5,254,843 | A | | 10/1993 | Hynes et al. ................ 235/449 |
| 5,404,377 | A | | 4/1995 | Moses ........................ 375/200 |
| 5,473,631 | A | | 12/1995 | Moses ........................ 375/202 |
| 5,539,812 | A | * | 7/1996 | Kitchin et al. ............. 379/189 |
| 5,680,462 | A | * | 10/1997 | Miller et al. ................ 380/263 |
| 5,712,920 | A | | 1/1998 | Spille ........................ 381/104 |
| 5,748,763 | A | | 5/1998 | Rhoads ....................... 382/115 |
| 5,748,783 | A | | 5/1998 | Rhoads ....................... 382/232 |
| 5,809,139 | A | | 9/1998 | Girod et al. .................... 380/5 |
| 5,812,976 | A | | 9/1998 | Ryan .......................... 704/201 |
| 5,828,416 | A | | 10/1998 | Ryan .......................... 348/512 |
| 5,845,251 | A | | 12/1998 | Case .......................... 704/500 |
| 5,889,868 | A | | 3/1999 | Moskowitz et al. ........... 380/51 |
| 5,915,027 | A | | 6/1999 | Cox et al. ..................... 380/54 |
| 5,930,369 | A | | 7/1999 | Cox et al. ..................... 380/54 |
| 5,940,134 | A | | 8/1999 | Wirtz ......................... 348/473 |
| 5,956,430 | A | | 9/1999 | Kunitake et al. ............ 382/246 |
| 5,960,081 | A | | 9/1999 | Vynne et al. .................... 380/10 |
| RE36,430 | E | | 12/1999 | Halbert-Lassalle et al. .. 370/204 |
| 6,005,501 | A | | 12/1999 | Wolosewicz ................. 341/52 |
| 6,031,914 | A | | 2/2000 | Tewfik et al. ................ 380/54 |
| 6,037,984 | A | | 3/2000 | Isnardi et al. ............... 348/403 |
| 6,041,295 | A | | 3/2000 | Hinderks .................... 704/206 |
| 6,061,793 | A | | 5/2000 | Tewfik et al. ............... 713/176 |
| 6,064,748 | A | * | 5/2000 | Hogan ........................ 382/100 |
| 6,064,764 | A | | 5/2000 | Bhaskaran et al. .......... 382/183 |
| 6,069,914 | A | | 5/2000 | Cox ........................... 375/150 |
| 6,078,664 | A | | 6/2000 | Moskowitz et al. ........... 380/28 |
| 6,122,403 | A | | 9/2000 | Rhoads ....................... 382/233 |
| 6,128,736 | A | | 10/2000 | Miller ........................ 713/176 |
| 6,131,161 | A | | 10/2000 | Linnartz ..................... 713/176 |
| 6,175,627 | B1 | | 1/2001 | Petrovic et al. ............... 380/42 |
| 6,219,634 | B1 | | 4/2001 | Levine .................... 704/200.1 |

FOREIGN PATENT DOCUMENTS

| | | |
|---|---|---|
| EP | 0162681 B1 | 5/1985 |
| EP | 0200301 A1 | 2/1986 |
| EP | 0875107 B1 | 9/1999 |
| JP | 10303755 | 11/1998 |
| WO | WO 97/13248 | 4/1997 |
| WO | WO 97/31440 | 8/1997 |
| WO | WO 97/33391 | 9/1997 |
| WO | WO 98/03014 | 1/1998 |
| WO | WO 98/31152 | 7/1998 |
| WO | WO 99/29114 | 6/1999 |
| WO | WO 00/07303 | 2/2000 |
| WO | WO 00/22605 | 4/2000 |

OTHER PUBLICATIONS (Rev 3) Annex B and C added Dec. 20, 1995. Available on the Internet at http://www.atsc.org/Standards/A52/Errata sheet for Document A/52, Jul. 22, 1999, Dolby Laboratories document S99/12496/12659, available on the.

Internet at http://www.dolby.com/tech/ATSC_err.pdf. Lacy, et al paper "On Combining Watermarking with Perceptual Coding".

Lacy, et al paper "Intellectual Property Protection Systems and Digital Watermarking".

Bosi et al., "ISO/IEC MPEG-2 Advanced Audio Coding" JAES Oct. 97.

Herre and Johnston "Enhancing Performance of Perceptual Audio Coders by Using Temporal Noise Shaping (TNS)," AES Preprint Nov. 8-11, 1996.

Neubauer and Herre "Audio Watermarking of MPEG-2 AAC Bit Streams," AES Preprint, Feb. 19-22, 2000.

ISO/IEC 13818-7:1997(E) Information technology—Generic coding of Moving pictures and associated audio information-, Part 7: Advanced Audio Coding (AAC).

Siebanhaar et al, AES Convention Paper 5344, "Combined Compression/Watermarking for Audio Signals," May 12-15, 2001.

Van der Veen et al, AES Convention Paper 5345 "Robust, Multi-Functional and High-Quality Audio Watermarking Technology," May 12-15, 2001.

Neubauer et al, AES Convneition Paper 5346 "A Compatible Family of Bitstream Watermarking Schemes for MPEG-Audio," May 12-15, 2001.

Hatung and Girod "Digital Watermarking of MPEG-2 Coded Video in the Bitstream Domain," IEEE 1997.

Fielder et al, "AC-2 and AC-3: Low-Complexity Transform-Based Audio Coding," Collected Papers on Digital Audio Bit-Rate Reduction, N. Geilchrist and C. Grewin, Eds (Audio Engineering Society, New York 1996), pp. 54-72.

Steve Vernon, "Design and Implementation of AC-3 Coders," IEEE Tr. Consumer Electronics, vol. 41, No. 3, Aug. 1995.

Karlheinz Brandenburg, "MP3 and AAC Explained," AES 17$^{th}$ International Conference on High Quality Audio Coding, Florence, Italy, 1999.

Todd et al, "AC-3: Flexible Perceptual Coding for Audio Transmission and Storage," AES Preprint 3796, Feb. 26-Mar. 1, 1995.

Princen et al, "Subband/Transform Coding Using Filter Bank Designs Based o Time Domain Aliasing Cancellation," in Proc. ICASSP 1987, pp. 2161-2164.

Princen and Bradley "Analysis/Synthesis Filter Bank Design Based on Time Domain Aliasing Cancellation," IEEE Trans. Acoust., Speech, Signal Process., vol. ASSP-34, pp. 1153-1161 (Oct. 1986).

Fielder, Lyman, Vernon and Todd, "Professional Audio Coder Optimized for Use with Video," AES Preprint Sep. 24-27, 1999.

Truman, Davidson, Ubale and Fielder, "Efficient Bit Allocation, Quantization, and Coding in an Audio Distribution System," AES Preprint Sep. 24-27, 1999.

Brandenburg, et al, "Overview of MPEG Audio: Current and Future Standards for Low-Bit Rate Audio Coding," J. Audio Eng. Soc., vol. 45, No. 1/2, Jan./Feb. 1997, pp. 4-21.

Watson, et al., "Design and Implementation of AAC Decoders," IEEE Transactions on Consumer Electronics, vol. 46, No. 3, Aug. 2000, pp. 819-824.

Bosi, et al., "High Quality, Low-Rate Audio Transform Coding for Transmission and Multimedia Applications," AES Convention Paper 3365, Oct. 1-4, 1992.

Mark Davis, "The AC-3 Multichannel Coder," AES Convention Paper 3374, Oct. 7-10, 1993 Laneman, et al., Huffman Code Based Error Screening and Channel Code Optimization for Error Concealment.

In Perceptual Audio Coding (PAC) Algorithms, IEEE Transactions on Broadcasting, vol. 48, No. 3, Sep. 2002, pp. 193-206.

* cited by examiner

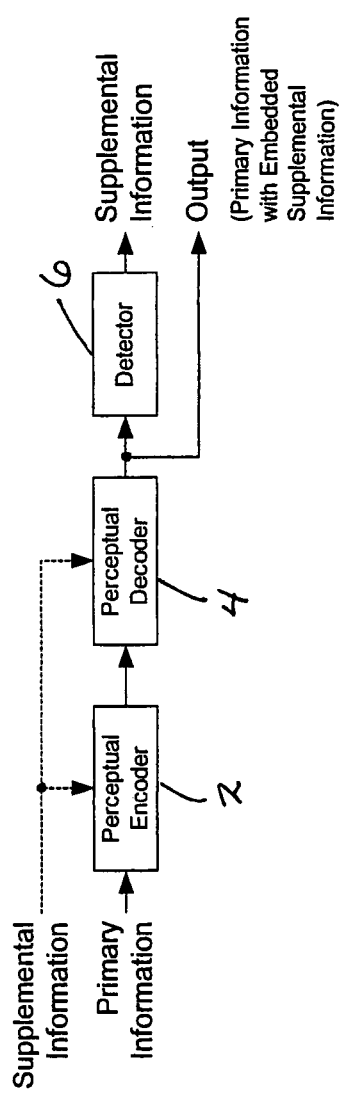
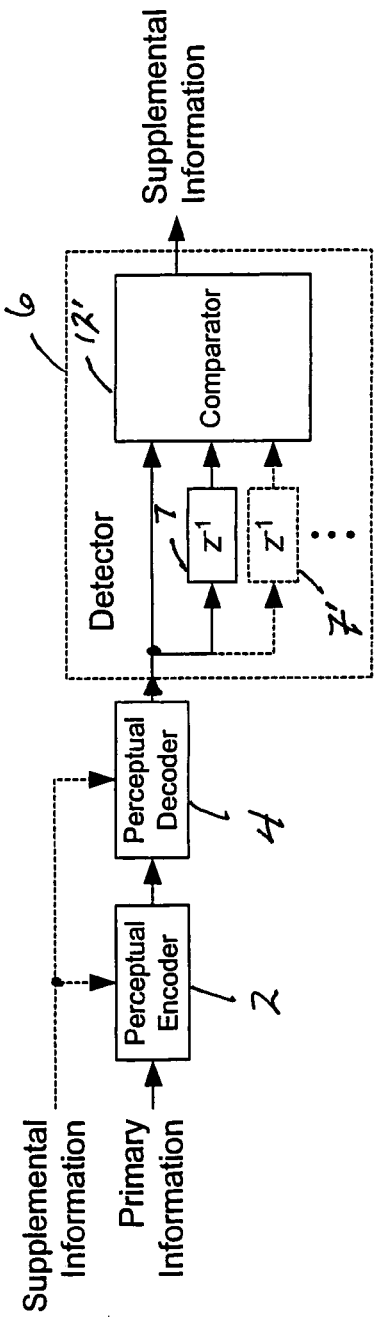
FIG. 3A
FIG. 3B

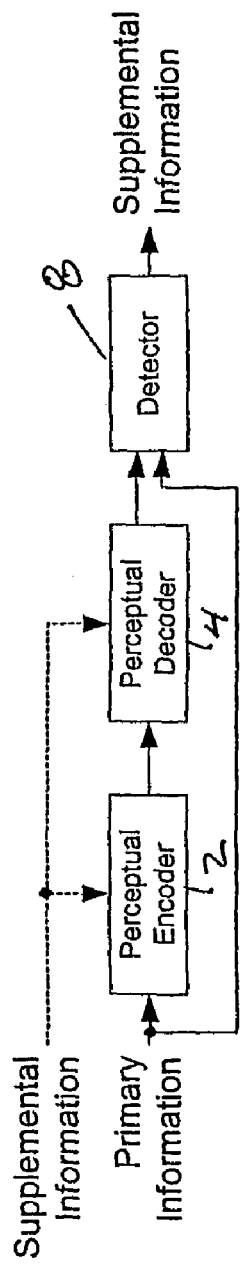
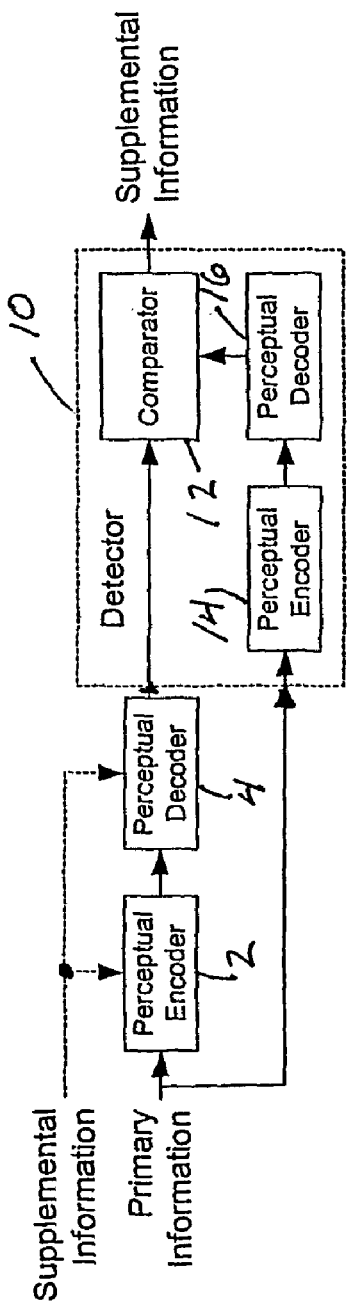

Dolby Audio Coders (Dolby Digital, Dolby E)

| Category | Parameter | Encode / Decode | Signal Characteristic of Watermark |
|---|---|---|---|
| Masking model and bit allocation | SNR offset (csnroffst, fsnroffst, cplfsnroffst, lfefsnroffst) | Yes / Yes | Spectrally uniform difference in the quantizer error. |
| Masking model and bit allocation | Delta bit-allocation (deltba, cpldeltba) | Yes / Yes | Spectrally-banded difference in the quantizer error. |
| Masking model and bit allocation | Slow decay code (sdcycod, cplsleak) | Yes / Yes | Slight quantizer error upwards in frequency relative to a masker. |
| Masking model and bit allocation | Fast decay code (fdcycod, cplfleak) | Yes / Yes | Slight quantizer error immediately upwards in frequency relative to a masker. |
| Masking model and bit allocation | Back decay code (backleak) | Yes / Yes | Slight quantizer error downwards in frequency relative to a masker. |
| Masking model and bit allocation | Slow gain code (sgaincod) | Yes / Yes | Slight quantizer error upwards in frequency relative to a masker. |
| Masking model and bit allocation | Fast gain code (fgaincod, cplfgaincod, lfegaincod) | Yes / Yes | Slight quantizer error upwards in frequency relative to a masker. |
| Masking model and bit allocation | Back gain code (backgain) | Yes / Yes | Slight quantizer error downwards in frequency relative to a masker. |
| Masking model and bit allocation | dB per bit code (dbpbcod) | Yes / Yes | Slight quantizer error weighted more for lower amplitudes. |

FIG. 6A

| | | | |
|---|---|---|---|
| Masking model and bit allocation | Masking floor code (floorcod) | Yes / Yes | Slight uniform difference in the quantizer error from the mask for low-level signals. |
| Channel coupling | Rematrixing flag (rematflg) | Yes / Yes | Distortion between channels in time. |
| Channel coupling | Coupling in use flag (cplinu) | Yes / No | Distortion between channels in time. |
| Channel coupling | Coupling begin frequency code (cplbegf) | Yes / Yes | Slight spectral distortion beginning at different frequencies in time. The distortions are relative to that original channel's signal, which has distortion due to the fact that coupling combines multiple channels into one channel. |
| Frequency bandwidth / Channel coupling | Channel bandwidth code (chbwcod) / Coupling end frequency code (cplendf) | Yes / Yes | Time-varying bandwidths or end-frequencies of signal. |
| Channel coupling | Coupling band structure (cplbndstrc) | Yes / No | Slight spectral distortion based on grouping of coupling channel spectral bands. |
| Phase relationship | Phase flag (phsflg) | Yes / No | Phase inversion of spectral content. |
| Dither control | Dither flag (dithflag) | Yes / No | Addition (or removal) of narrow-band, shaped noise. |
| Dither control | Dither signal (scaled_dither_value) | No / Yes | Addition (or removal) of narrow-band, shaped noise. |
| Time/frequency transform window | Window function/ type / window alpha | Yes / Yes | Wide-spectrum noise, time-aliasing noise. |
| Masking model and bit allocation | Exponent strategy (chexpstr, cplexpstr) | Yes / Yes | Spectrally-banded difference in the quantizer error. |

FIG. 6B

MPEG Audio Coders (MPEG-1 layer 2, layer 3; MPEG-2 AAC; MPEG-4 AAC)

| Category | Parameter | Encode / Decode | Signal Characteristic |
|---|---|---|---|
| Masking model and bit allocation | Scale factors (sfb) | Yes / Yes | Spectrally-banded modification of the quantizer distortion. |
| Channel coupling | M/S coding used flag (ms_used) | Yes / Yes | Distortion between channels in time. |
| Channel coupling | Intensity stereo position (dpcm_is_position, is_position) | Yes / Yes | Distortion between channels in time. |
| Channel coupling | Coupling gain scale (gain_element_scale) | Yes / Yes | Distortion between higher frequencies in time. |
| Masking model and bit allocation | Prediction attenuation | Yes / No | Spectrally-uniform distortion in time |
| Temporal noise shaping | TNS filter coefficients (coef) / TNS filter order | Yes / No | Increased distortion in time around transients. |
| Time/frequency transform window | Window function/type (window_shape) | Yes / Yes | Broad spectral energy lasting an entire frame. |
| Masking model and bit allocation | Perceptual noise shaping - PNS | Yes / Yes | Spectrally-banded uncorrelated noise |

FIG. 7

MPEG Video Coders (MPEG-1; MPEG-2; MPEG-4)

| Category | Parameter | Encode / Decode | Signal Characteristic |
|---|---|---|---|
| Frame type | Frame type (I, P, B) | Yes / Yes | Correlation differences in time. |
| Motion control | Motion prediction | Yes / Yes | Spatially-localized distortion. |

FIG. 8 default masking threshold = ☐
modulated masking threshold = ▨
default decoded signal = ▧
modulated decoded signal = ☐
FIG. 11D
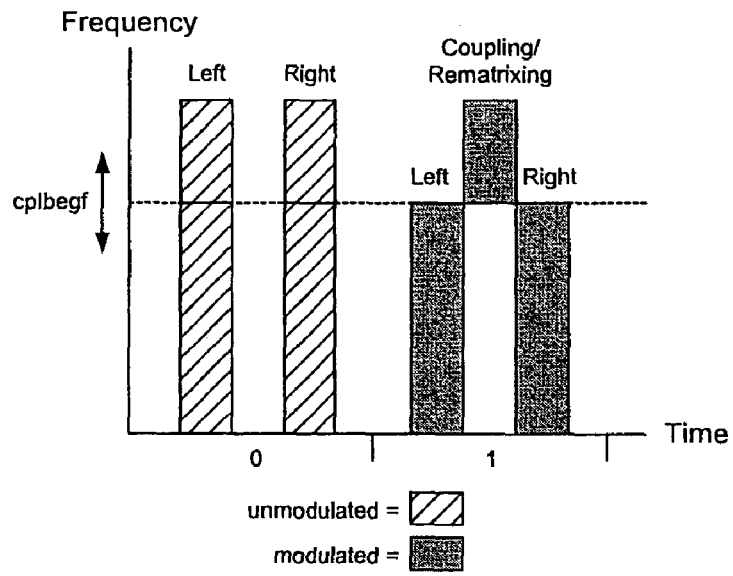
unmodulated = ▧
modulated = ▨
FIG. 13
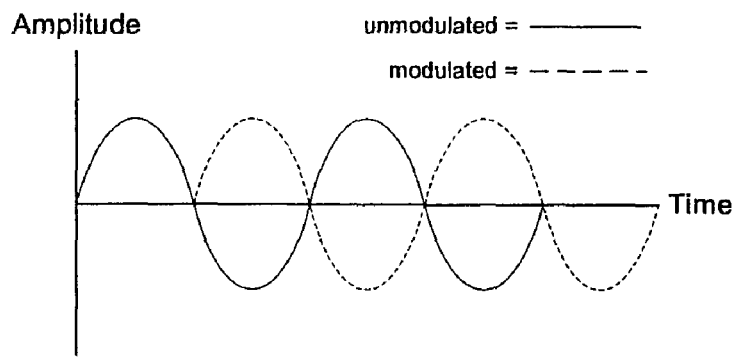
FIG. 14

MODULATING ONE OR MORE PARAMETERS OF AN AUDIO OR VIDEO PERCEPTUAL CODING SYSTEM IN RESPONSE TO SUPPLEMENTAL INFORMATION

TECHNICAL FIELD

The invention relates to steganography in the context of audio or video signals. More particularly, the invention relates to modifying the operation of the encoder and/or the decoder of an audio or video perceptual coding system in accordance with supplemental information so that the supplemental information may be detectable in the output of the decoder. Such supplemental information is often referred to as a "watermark". Watermarking is an aspect of steganography.

BACKGROUND ART

Steganography and Watermarking

Steganography is the science of hiding a signal within another signal. Steganographic algorithms or processes may be robust or "fragile"—that is, it may be very difficult or very easy to corrupt the hidden signal. Considering audio applications, one very fragile steganographic technique is to use the least significant bit of a PCM channel to carry a data stream independent from the audio program content, which would be carried in the upper bits. The hidden data channel carried in the least significant bit does not significantly distort the audio program, but rather acts as a low-level dither signal. This technique is fragile in the sense that simple audio processing can destroy the data signal, such as gain changes, digital-to-analog conversion, etc.

Watermarking is a form of steganography in which, typically, the signal hiding technique is intended to be robust against corruption by either normal processing or deliberate attack. As such, watermarks are valuable in applications related to security, such as copy protection or identification of content ownership. In such applications, the watermark may carry, for example, copy control status, copyright information, and information related to how the main program material was released. Even if the main program is subsequently stolen or illegally copied, ideally, the watermark remains embedded within the program material and provides a way to establish proof of ownership.

One or more watermarks may be inserted at many points along a "content" (e.g., audio or video performance) distribution path. Information added to the signal at the beginning of this path may contain copyright information or the mastering location while information added at the end of the signal chain may contain playback information, such as date/time stamps and/or machine serial number. For content to be traced to its origin, watermarks may be embedded at various locations along the distribution path.

One important consideration for watermarking of audio and video signals is that the hidden signal should not unnecessarily degrade the quality of the signal in which it is hidden. Ideally, the watermark should be completely transparent; that is, the difference between the watermarked signal and the original signal should be imperceptible (to an unaided human observer). Of course, the difference must be detectable by some means, as otherwise the watermark signal is unrecoverable. However, watermarks may be intentionally perceptible for some applications. For example, images may be visibly watermarked in order to prevent commercial use. In addition, paper may be watermarked in order to convey a perceptible seal of authenticity.

Thus, the goals of watermarking may be summarized as follows:
modification of a primary signal in such a way as to add a secondary signal or supplemental information, resulting in a modified primary signal,
the difference between the original and the modified primary signal should be detectable but imperceptible, and
the modification should be difficult to remove or obscure.

Perceptual Coding

Perceptual coding is the science of removing perceptual irrelevancies from signals in order to reduce them to a more efficient form of expression. For example, in some applications, perceptual coding is used to reduce the transmission data rate of digital audio or video signals in order to meet a predetermined channel capacity constraint. Perceptual coding of audio and video signals is a well-established discipline, enabling audio and video signals to be reduced to relatively low data rates for efficient storage and transmission.

Many perceptual coders operate by analyzing the content of the original signal and identifying the perceptual relevance of each signal component. A modified version of the original signal is then created, such that the modified version may be expressed using a lower data rate than the original signal. Ideally, the difference between the original and modified signals is imperceptible. Noise, usually quantizing noise, or other distortion is controllably introduced in order to reduce the data rate of the signal. Properties of human perception are taken into account to manipulate the noise or other distortion so that it remains imperceptible or minimally perceptible.

Perceptual coders employ a masking model intended to reflect human perception to some degree of accuracy. The masking model provides a perceptual masking threshold that establishes a boundary for perceptibility. The solid line in FIG. 1 shows the sound pressure level at which sound, such as a sine wave or a narrow band of noise, is just audible, that is, the threshold of hearing. Sounds at levels above the curve are audible; those below it are not. This threshold is clearly very dependent on frequency. One is able to hear a much softer sound at say 4 kHz than at 50 Hz or 15 kHz. At 25 kHz, the threshold is off the scale—no matter how loud it is, one cannot hear it.

Consider the threshold, as shown by the dashed line in FIG. 1, in the presence of a relatively loud signal at one frequency, say a 500 Hz sine wave, shown as the vertical line in the figure. The threshold rises dramatically in the immediate neighborhood of 500 Hz, modestly somewhat further away in frequency, and not at all at remote parts of the audible range.

This rise in the threshold is called masking. In the presence of the loud 500 Hz sine wave signal (the "masking signal" or "masker"), signals under this threshold, which may be referred to as the "masking threshold", are hidden, or masked, by the loud signal. Further away, other signals can rise somewhat in level above the no-signal threshold, yet still be below the new masked threshold and thus be inaudible. However, in remote parts of the spectrum in which the no-signal threshold is unchanged, any noise that was audible without the 500 Hz masker remains just as audible with it. Thus, masking is not dependent upon the mere presence of one or more masking signals; it depends upon where they are spectrally. Some musical passages, for example, contain many spectral components distributed across the audible frequency range, and therefore give a masked threshold curate that is raised everywhere relative to the no-signal threshold curve. Other musical passages, for example, consist of relatively loud sounds from a solo instrument having spectral components confined to a small part of the spectrum, thus giving a masked curve more like the sine-wave masker example of FIG. 1.

Masking also has a temporal aspect that depends on the time relationship between the masker(s) and the masked signal(s). Some masking signals provide masking essentially only while the masking signal is present ("simultaneous masking"). Other masking signals provide masking not only while the masker occurs but also earlier in time ("backward masking" or "premasking") and later in time ("forward masking" or "postmasking"). A "transient", a sudden, brief and significant increase in signal level, may exhibit all three "types" of masking: backward masking, simultaneous masking, and forward masking, whereas, a steady state or quasi-steady-state signal may exhibit only simultaneous masking.

All noise and distortion that is added by the perceptual coding process should remain below the masking threshold in order to avoid perceptible impairments. If the noise or distortion added by the coding process reaches, but does not exceed, the masking threshold, the signal is said to be coded at the level of "just noticeable difference". The "coding margin" of a system may be defined as the amount by which the added noise or distortion lies beneath the masking threshold—a coding margin of zero means that the signal is coded at the level of just noticeable difference, while a positive coding margin means that the added noise or distortion is imperceptible with some room to spare, and a negative coding margin means that perceptible impairments are present.

Note that different aspects of the signal (e.g., bandwidth, time resolution, spatial accuracy, etc.) may be coded to different degrees of accuracy, resulting in different coding margins for different signal characteristics. If a source signal is coded such that the coding margin is non-negative for all characteristics of the signal, it may be said to be perceptually equivalent to the source.

A perceptual coding system consists of an encoder that may communicate bit allocation information or perceptual model information along with coded data to a decoder. There are three main types of perceptual coding systems: forward adaptive, backward adaptive, and a hybrid of the two. In a forward adaptive system, the encoder explicitly sends bit allocation information to the decoder. A backward adaptive system does not send any bit allocation or perceptual model information to the decoder. The decoder recreates the bit allocation from the coded data. A hybrid system allows for some allocation information, such as a less than full resolution form of the perceptual model, to be included with the coded data, but much less than in a full forward adaptive system. A more detailed discussion of these three types of perceptual coding systems is set forth in "AC-3: Flexible Perceptual Coding for Audio Transmission and. Storage," by Craig C. Todd et al, Preprint 3796, 96th Convention of the Audio Engineering Society, Feb. 26-Mar. 1, 1994. Perceptual coding systems developed by Dolby Laboratories, such as the Dolby Digital and Dolby E coding systems, identified further below, are examples of hybrid forward/backward adaptive systems, while the MPEG-2 AAC coding system, also identified further below, is an example of a forward adaptive system.

The goals of perpetual coders may be summarized as follows:
  modification of a primary signal resulting in a modified signal,
  the difference between the original and the modified signal should be imperceptible, and
  representation of the modified signal should be more efficient than representation of the original signal.

Security

Watermarking as a security measure is only as strong as the ability of the watermark to survive a direct attack. Many watermarking techniques currently in use attempt to shield themselves from successful attack by keeping the details of the watermark a secret, under the presumption that if the watermark is not publicly known, attackers will not know how to modify the watermarked signal to obscure the watermark data. This is a principle known as "security through obscurity." In the field of cryptography, security through obscurity is generally dismissed as an illogical principle. If an algorithm or process derives its security through secrecy, it only takes one person to disclose the details of the technique for the security of the entire system to be compromised.

The goals of security may be summarized as follows:
  protect content in such a way that theft of the content is either unusable or enable subsequent proof of piracy and traceability to the source of the piracy,
  be robust against attacks, and
  maintain high security at even the weakest link in the system.

DISCLOSURE OF INVENTION

The present invention is directed to a method of modifying the operation of the encoder and/or the decoder of a perceptual coding system in response to supplemental information so that the supplemental information may be detectable in the output of the decoder. One or more parameters in the encoder and/or the decoder are modulated in response to the supplemental information.

In accordance with the present invention, supplemental information, such as watermark information, is conveyed by modulating one or more parameters in the encoder and/or the decoder of a perceptual coding system in order to cause a detectable, but preferably imperceptible, change in the output of the decoder. This information is "supplemental" in that it is in addition to the primary information, such as audio or video information, carried by the coding system. Typically, such supplemental information is in the nature of a "watermark", although it need not be. Modulation of one or more parameters may be said to "embed" the supplemental or watermark information in the encoded signal (in the case of modulating parameters in the perceptual encoder) and in the decoded signal (in the case of modulating parameters in the perceptual encoder and/or the perceptual decoder).

Although certain implementations of the invention, when implemented at least partly in an encoder, may indirectly modify bitstream data representing the primary information, the invention does not contemplate the direct modification of bitstream data representing primary information (nor the modification of the primary information that becomes bitstream data after quantization in the perceptual encoder). The invention contemplates detection of the supplemental information in the perceptual decoder output (whether such information is conveyed as the result of actions in the encoder and/or the decoder) rather than in the undecoded bitstream.

By "modulating" we mean varying the value of a parameter between or among one or more values (states), wherein said values may include a "default value", which value the parameter otherwise would have been were it not for the action of the present invention. For example, the parameter value may be varied between or among its default value and one or more other values (in the case of a parameter having only two possible values, such a parameter sometimes referred to as a "flag", the parameter may be varied between those two values), or it may be varied between or among one or more other values, which values do not include the default value.

By "modulating in response to" supplemental information or a watermark signal or sequence we mean that the modulation of a parameter is controlled by the supplemental information or watermark signal or sequence either directly or indirectly such as when the control is modified by a function of one or more other signals, the signals including, for example, a set of instruction such as a deterministic sequence or the input signal applied to the coding system.

By "parameter" we mean a variable within a perceptual coding system that is not bitstream data representing primary information. Examples of Dolby Digital (AC-3), MPEG audio, and MPEG video parameters that are suitable for modulating in accordance with aspects of the present invention are shown below in the tables of FIGS. 6, 7 and 8, respectively. The invention also contemplates the modulation of one or more parameters that are not recognized in published perceptual coder standards, including parameters yet to be defined.

By "bitstream data representing primary information" we mean data bits in the encoded bitstream, generated by the perceptual encoder but not yet decoded, that carry the primary information, such as audio or video information. Bitstream data representing primary information includes, for example, in the case of a Dolby Digital (AC-3) system, exponents and mantissas, and, in the case of an MPEG-2 AAC system, scale factors and Huffman encoded coefficients.

In complex perceptual coding systems (e.g., Dolby Digital and Dolby E audio, MPEG audio, MPEG video, etc.), a large number of independent coding parameters provide a significant degree of coding flexibility. "Dolby", "Dolby Digital" and Dolby E" are trademarks of Dolby Laboratories Licensing Corporation.

Details of Dolby Digital coding are set forth in "Digital Audio Compression Standard (AC-3)," Advanced Television Systems Committee (ATSC), Document A/52, Dec. 20, 1995 (available on the World Wide Web of the Internet at www.atsc.org/Standards/A52/a_52.doc.) See also the Errata Sheet of Jul. 22, 1999 (available on the World Wide Web of the Internet at www.dolby.com/tech/ATSC_err.pdf).

Details of Dolby E coding are set forth in "Efficient Bit Allocation, Quantization, and Coding in an Audio Distribution System", AES Preprint 5068, 107th AES Conference, August 1999 and "Professional Audio Coder Optimized for Use with Video", AES Preprint 5033, 107th AES Conference August 1999.

Details of MPEG-2 AAC coding are set forth in ISO/IEC 13818-7:1997(E) "Information technology—Generic coding of moving pictures and associated audio information—, Part 7: Advanced Audio Coding (AAC)," International Standards Organization (April 1997); "MP3 and AAC Explained" by Karlheinz Brandenburg, AES 17th International Conference on High Quality Audio Coding, August 1999; and "ISO/IEC MPEG-2 Advanced Audio Coding" by Bosi, et. al., AES preprint 4382, 101st AES Convention, October 1996.

An overview of various perceptual coders, including Dolby encoders, MPEG encoders, and others is set forth in "Overview of MPEG Audio: Current and Future Standards for Low-Bit-Rate Audio Coding," by Karlheinz Brandenburg and Marina Bosi, J. Audio Eng. Soc., Vol. 45, No. 1/2, January/February 1997.

Specific default values for perceptual coding parameters are generally chosen by the coding system based on the characteristics of the input signal. However, there is usually more than one way to select coding parameter values that produce decoded signals having no perceptible differences and such variations in coding parameter values may result in decoded signals with detectable, yet imperceptible, differences. Note that imperceptibility refers to human perception whereas detectability is based on the capabilities of a non-human detector.

A supplemental signal or watermark detector recovers the embedded information contained within the reproduced (decoded) signal. In the case of audio signals, for example, the detection may be accomplished acoustically in some cases, while electronic detection may be required in other cases. Electronic detection may be in the digital or analog domains. Electronic detection in the digital domain may be in the time or frequency domain of the decoded output or may be in the frequency domain within the decoder prior to frequency to time conversion. Extracting the watermark after acoustic processing is considered a more difficult challenge because of the addition of room noise, speaker and microphone characteristics, and overall playback volume.

Many practical perceptual coding systems do not meet the requirement of keeping added noise beneath the level of just noticeable difference. Perceptibility requirements in perceptual coding systems are often relaxed to meet bit-rate targets or complexity limits. In these cases, although noise added during perceptual coding may be perceptible, there likely will be values other than default values to which coding parameters may be modulated that will not render any more perceptible the already perceptible noise. Although the modulation of a parameter may result in substantially no perceptible change in perceived noise, nevertheless, it may result in a detectible change in the decoded signal.

Preferably, in accordance with aspects of the present invention, one or more parameters are modulated so that the effects of the modulation cause the noise and distortion added by perceptual coding to be close to, but below, the level of just noticeable difference in all or part of the frequency spectrum ("distortion", in this sense, is the difference between the coded and original signals, and may or may not result in audible artifacts). Therefore, it would be difficult to remove or obscure the resulting effects of modulating one or more parameters without exceeding the masking threshold and creating a perceptible impairment. On the other hand, if an attack were below the masking threshold, then part of the effects of parameter modulation likely will remain.

As suggested above, aspects of the present invention may also be employed when the encoder does not encode the primary source signal so that noise and distortion are below the level of just noticeable difference. In this case, the source signal is encoded in such a way that it is impaired relative to the source, and the parameter modulation introduces impairments in the decoded signal that are different from a detection standpoint, but, preferably, are substantially the same perceptibly. As in the previous case, it would be difficult to remove or obscure the resulting effects of the parameter modulation in the decoded signal without exaggerating the impairment or introducing additional impairments with a greater degree of perceptibility.

The approach of the present invention is fundamentally different from techniques that apply a watermark prior to perceptual encoding. In those techniques, even though the coding system may contain enough coding margin to convey a watermark, there is no guarantee that the particular method chosen to convey the a priori watermark coincides with the location of the perceptual coding system's coding margin. Because such prior systems operate independently, they may occasionally interact badly, introducing perceptible impairments or causing the watermark to be obscured.

As mentioned above, perceptual encoders reduce the data rate of an input signal by removing perceptually redundant information. For example, a constant data rate encoder reduces a fixed rate of input information to a lower fixed rate of information. Part of this data reduction requires a function sometimes characterized as a "rate control" that ensures that the encoder output does not exceed the final fixed information size. The rate control reduces information until it has achieved the final encoded size.

In some perceptual encoders, a distortion measurement is paired with the rate control to ensure that the correct information is discarded. A distortion measurement compares the original input signal with the encoded signal (output of the rate control). The distortion measure may be used to control coding parameters to change the outcome of the rate control process.

The distortion rate control aspect of the present invention seeks to solve the problem of how to embed a watermark in a perceptual encoder while maximizing the strength and minimizing the perceptibility of the embedded signal. In one embodiment, the present invention also allows a user to choose the strength, or energy, of the embedded signal by adjusting a parameter in the watermarking embedding process.

In addition to parameter modulation, aspects of the present invention employ a set of instructions such as a deterministic sequence to vary certain aspects of the parameter modulation and, hence, characteristics of the resulting watermark. Deterministic sequences are generated by mathematical processes that produce sequences of binary ones and zeros computed given a defining equation (the generator equation) and an initial state (the key). A number of alternative aspects of the invention employing deterministic sequences are disclosed. These techniques may improve the imperceptibility of the watermark and also may improve the robustness of the watermark, which is an interesting and useful result inasmuch as many other techniques that improve imperceptibility tend to degrade robustness. Finally, these techniques may improve security, in the sense that it becomes possible to reveal all aspects of the watermarking system (except for the deterministic sequence key) without sacrificing the robustness of the system.

Deterministic sequence aspects of the present invention may include one or more of the following acts:

Using a deterministic sequence to modify the rate of parameter modulation transitions and, consequently, the watermark symbol transition rate (see Table I, below), Using a deterministic sequence to select the parameter(s) for modulation (see Table 2, below), and Using a deterministic sequence to modify the rate at which the choice of parameters for modulation changes (see Table 3, below).

In addition, alternative aspects of the present invention include acts of using characteristics of the source signal to control parameter modulation and/or choice of parameters for modulation. Source-signal-responsive aspects of the present invention may include one or more of the following acts:

Using characteristics of the source signal to variably modify the parameter modulation rate and, consequently, the watermark symbol transition rate (see part a of Table 4, below), Using characteristics of the source signal to variably modify the rate at which the choice of parameters for modulation changes (see part b of Table 4, below), and Using characteristics of the source signal to variably modify the number of parameters in the available set of parameters for modulation (see Table 5, below).

As explained further below, both a deterministic sequence and characteristics of the source signal may be used in connection with modulating parameters according to alternative aspects of the present invention. See Tables 6, 7 and 8, below.

For some implementations of the invention, watermark detection in the output of the perceptual decoder is likely to require access to the primary information applied to the encoder. For some other implementations of the invention, watermark detection may be performed without having access to the original primary information at the expense of greater complexity in the detection.

It is often desirable to apply a unique, or "serialized" (e.g., a serial number) watermark at the point where signals are delivered to an audience. In accordance with aspects of the present invention, supplemental information or a watermark is embedded during the perceptual decoding process. One or more parameters are modulated in the decoder prior to inverse quantization.

Imperceptibility may be maintained if the noise or distortion added by the decoder parameter modulation process does not exceed a perceptual threshold. In order to embed a watermark imperceptibly as part of thee decoding process, a perceptual threshold is used. Many perceptual coders transmit perceptual models from the encoding process to the decoding process in some form or another; however, other coders provide only approximations or coarse representations of the perceptual threshold. The most accurate perceptual threshold is derived from the unquantized, source spectral coefficients, but the data rate increase is significant if such data is transmitted to the decoder. Alternatively, the perceptual threshold provided to the decoder in a perceptual coding system may be an exponent of a mantissa in which the exponent represents the information sample having the maximum energy within a critical band (as in the Dolby Digital system). In order to improve the accuracy of the perceptual threshold in the decoder, exponents may be transmitted from the encoder that are based on an average of sample energy in a band instead of the maximum energy in the band.

Although modulating parameters in the decoder is similar to modulating parameters in the encoder in many respects, there is less flexibility. For example, modulating one or more parameters in a decoding system may require that care be taken when reformulating the bit allocation information based on the coding parameters. Furthermore, it is more difficult to render imperceptible the effects of parameter modulation in the decoder. One reason for this is that, at least in the case of an ideal encoder, the encoding process has already added quantization error up to the threshold of perceptibility. However, this is not always the case, as coding margin may exist, for example, due to imperfections in the perceptual model, a positive signal-to-noise ratio offset, or signal conditions.

BRIEF DESCRIPTION OF DRAWINGS

FIG. 3A is a functional block diagram illustrating an aspect of the present invention that includes a supplemental information detector function receiving the output of the coding system.

FIG. 3B is a functional block diagram illustrating with more detail of the detector function, the aspect of the present invention that includes a supplemental information detector function receiving the output of the coding system.

FIG. 4 is a functional block diagram illustrating an aspect of the present invention that includes a supplemental information detector function receiving both the output of the coding system and the input to the coding system.

FIG. 5. is a functional block diagram illustrating an aspect of the present invention in which the supplemental information detector function includes not only a comparator function, but also a perceptual encoder function and a perceptual decoder function, neither of which has its parameters modulated.

FIG. 6 is a table showing parameters suitable for modulation in certain perceptual audio coders of the hybrid forward/backward adaptive type.

FIG. 7 is a table showing parameters suitable for modulation in certain perceptual audio coders of the forward adaptive type.

FIG. 8 is a table showing parameters suitable for modulation in certain perceptual video coders.

FIG. 11D shows the legends employed in FIGS. 11A-C and 12A-C.

FIG. 13 is an idealized representation showing the effects, in certain perceptual audio coders, of modulating parameters other than masking parameters in certain perceptual audio coders, namely, the "coupling in use" flag, the rematrixing in use flag and the coupling begin frequency code.

FIG. 14 is an idealized representation showing the effects, in certain perceptual audio coders, of modulating a parameter other than a masking parameter, namely, the phase flag.

FIG. 24 is a logic flow diagram showing the inner iteration loop portion of the process for embedding a watermark using a threshold of perceptibility.

FIG. 25 is a logic flow diagram showing the outer iteration loop portion of the process for embedding a watermark using a threshold of perceptibility, in which outer loop spectral coefficients are amplified.

FIG. 26 is a logic flow diagram showing the modification of the process of FIG. 25 to fulfill the psychoacoustic model, or perceptual threshold, as much as possible while also embedding the supplemental information or watermark signal.

BEST MODE FOR CARRYING OUT THE INVENTION

Figure 1:
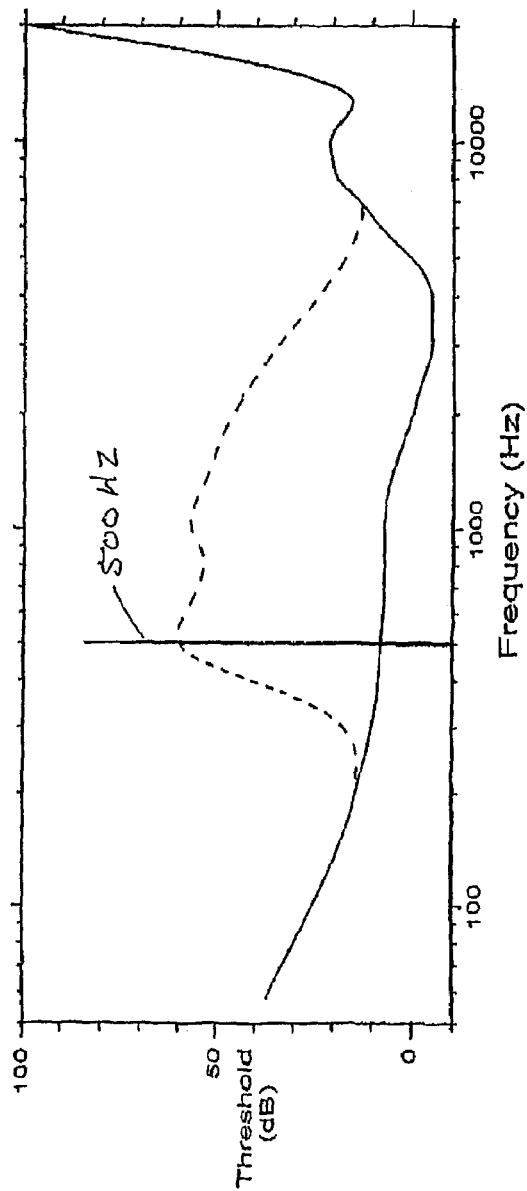
FIG. 1 is an idealized plot showing (solid line) the sound pressure level at which sound is just audible (the threshold of hearing) when no masking signals are present and showing (dashed line) the threshold of hearing in the presence of a 500 Hz sine wave.
Figure 2:
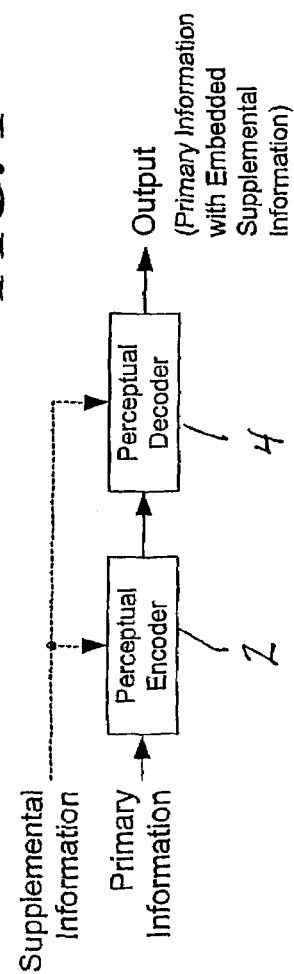
FIG. 2 is a functional block diagram illustrating the basic principles of the present invention in which supplemental information modulates one or more parameters of a perceptual encoder function and/or a perceptual decoder function in a perceptual coding system.

FIG. 2 is a functional block diagram illustrating the basic principles of the present invention. A perceptual encoder function 2 and a perceptual decoder function 4 comprise a perceptual coding system. Primary information, such as audio or video information, is applied to the perceptual encoder function 2. The encoder function 2 generates a digital bitstream that is received by the perceptual decoder function 4. One or more parameters in the encoder function and/or the decoder function are modulated in response to supplemental information (e.g., a watermark signal or sequence). Because supplemental information may be applied either to the encoder function or to the decoder function or to both, dashed lines are shown from the supplemental information to the encoder function and to the decoder function, respectively. The output of the perceptual decoder function is primary information with embedded supplemental information. The supplemental information may be detectable in the decoder function output.

If supplemental information is applied to both the encoder function 2 and the decoder function 4, typically, the information applied to one will be different from that applied to the other. For example, the supplemental information controlling the one or more encoder function parameters might be a watermark identifying the owner of the audio or video content and the supplemental information controlling the one or more decoder function parameters might be a serial number identifying the equipment that presents the audio or video content to one or more consumers. Typically, the supplemental information would be applied to the encoder function and the decoder function at different times.

FIGS. 3-5 are functional block diagrams illustrating the basic principles of an aspect of the present invention that includes a detector function for detecting the supplemental information in the output of the decoder function. Detection may be accomplished in the digital domain or the analog domain (electrical or acoustical) of the decoder function output. Detection may also be accomplished in the digital domain of decoder function after decoding but prior to the frequency domain to time domain conversion.

FIG. 3A is the same as FIG. 2 except that it includes a detector function 6 receiving the output of the decoder function 4 that detects the supplemental information in the output of the decoder function. The output of detector function 6 is the supplemental information. FIG. 4 is the same as FIG. 3 except that it includes a detector function 8 receiving not only the output of the decoder function 4 but also the same primary information applied to the encoder function. The essential function of the detector function 8 is to compare the original input information applied to the encoder function with the output of the decoder function in order to provide as its output the supplemental information. FIG. 5 is a variation of the FIG. 4 arrangement. In FIG. 5, as in FIG. 4, a detector function 10 receives the output of decoder function 4 and the primary information applied to the encoder function 2. However, detector function 10 differs from detector function 8 and includes not only a comparator function 12, but also a perceptual encoder function 14 and a perceptual decoder function 16. Encoder function 14 is the same as encoder function 2 except that its parameters are not modulated. Decoder function 16 is the same as decoder function 4 except that its parameters are not modulated. Thus the act of detecting the supplemental information in the output of the decoder is accomplished by one of the following acts:

observing the decoded signal, comparing the decoded signal to the signal applied to the encoder function, and comparing the decoded signal to the decoded signal from a substantially identical perceptual coding system in which no parameters in the encoder function or decoder function are modulated in response to supplemental information.

The detection arrangement of FIG. 3A is most suitable for detecting the effects of certain types of parameter modulation, such as when a bandwidth parameter is modulated (modulating bandwidth parameters is described in detail below). In order to detect the effects of modulating most parameters, it is necessary to compare the primary information applied to the encoder with the primary information carrying embedded supplemental information provided by the decoder as in the arrangements of FIGS. 4 and 5. The FIG. 5 arrangement makes it possible to do a more rigorous comparison because the only differences between the compared information will be those caused by the modulation parameters. In the FIG. 4 arrangement, the differences include other effects that may be introduced by the perceptual encoding and decoding processes.

Because the detection arrangement of FIG. 3A does not require access to the primary information applied to the perceptual encoder, it may be accomplished in real time or near real time, depending on which encoder and/or decoder parameters are modulated. For example, modulating a bandwidth parameter may allow detection by analyzing only the decoder output in real time or near real time. Particularly, detector function 6 of the FIG. 3A arrangement may include one or more delay functions so that the output of the decoder function 4 may be compared against itself. For example, as shown in FIG. 3B, the detector function 6 may include a comparator function 12' and one or more delay functions 7, 7', etc. so that the act of observing the decoded signal comprises comparing the decoded signal to a time delayed version of itself. Energy states from one or more previous blocks are subjected to a comparator function that uses a threshold to determine the symbol, in the manner, for example, of the bandwidth modulation detection described below. The block lengths are known by the detector and some form of synchronization must occur in order to align the expected symbol rate with the actual symbol rate. Modulation of other parameters may not allow detection in real time or near real time or may require comparing the decoder output to the encoder input signal as in the arrangements of FIGS. 4 and 5.

In arrangements such as those of FIGS. 4 and 5 in which the decoder output is compared to the encoder input, it is important to synchronize the input and output signals. Depending on which parameter or parameters are chosen for modulation and on the supplemental information data rate, it may be necessary to provide a high degree of synchronization between those signals. One way to do so is to embed a deterministic sequence, such as a PRN sequence in the primary signal so that the sequence is also embedded in the decoder output. By comparing the sequence in the input and output signals a fine-grained synchronization is possible.

Detection may be accomplished manually or, in some cases, automatically. Use of a PRN sequence in the primary signal may facilitate automatic detection. If done manually, visual aids such as a spectral analysis of compared signals may be employed.

Figures 6, 6A, 6B:
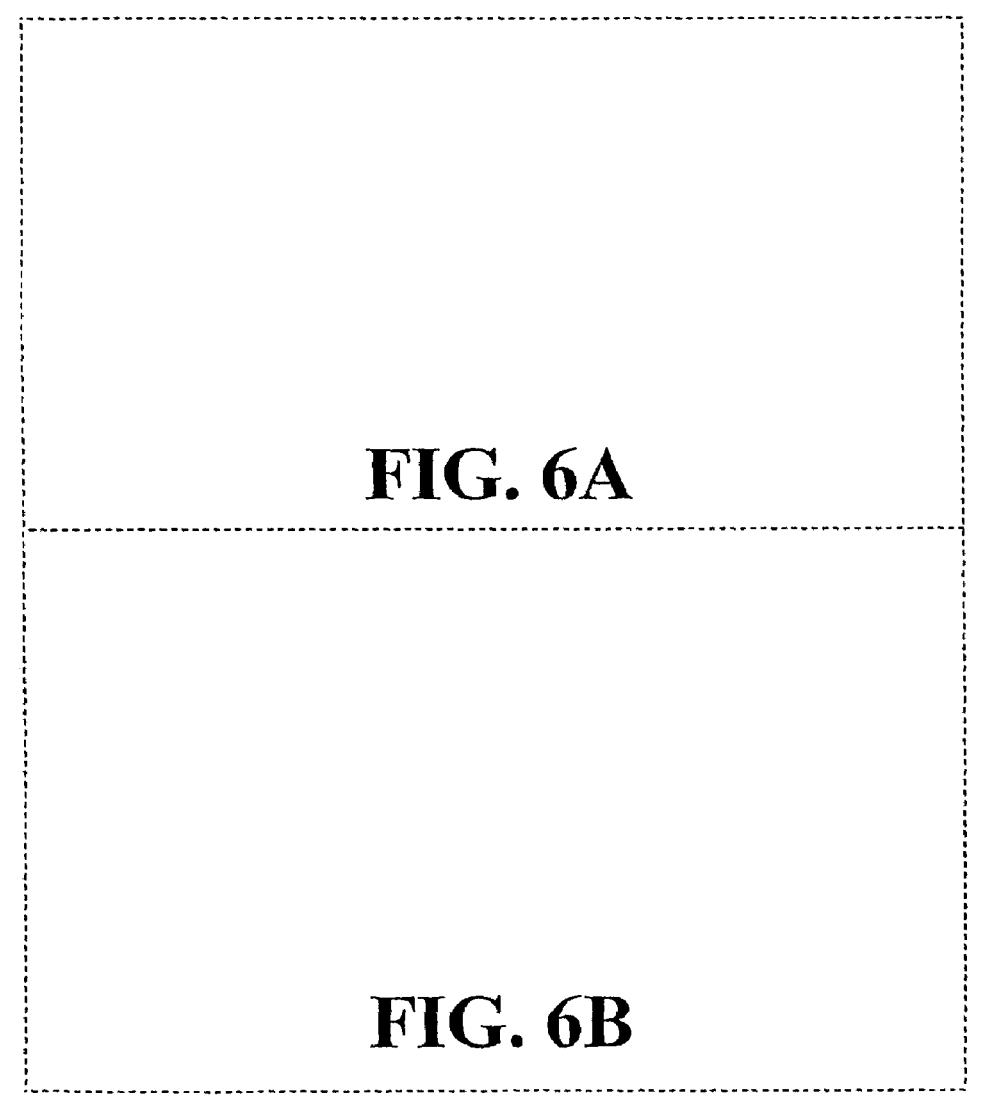

Some examples of the coding parameters that may be modulated to embed a watermark are set forth in several tables: a first table shown in FIG. 6 (Dolby audio coder parameters), a second table, shown in FIG. 7 (MPEG audio coder parameters), and a third table, shown in FIG. 8 (MPEG video coder parameters). For each category of parameter (e.g., "Masking model and bit allocation"), the respective table indicates the type of parameter (e.g., "SNR offset"), the specific parameter(s) (e.g., "csnroffst", "fsnroffst", etc.), if the parameter(s) is (are) susceptible to modulation in the encoder and/or in the decoder, and the resulting change in signal characteristics of the watermark in the decoded signal when the parameter(s) is (are) modulated. In the first column of the table shown in FIG. 6, there are six categories of parameters addressed: masking model and bit allocation, coupling between or among channels, frequency bandwidth, dither control, phase relationship, and time/frequency transform window. Note that in the first table, rematrixing can only be performed during decoding if rematflg is "0" (no rematrixing in the encoder) and in the second table, M/S coding can only be performed during decoding if ms_used is "0" (no M/S coding in the encoder).

Where a type of parameter has one or more parameters in a coding system, recognized abbreviations for the respective parameters are shown in parentheses. Thus, for example, the "SNR offset" type of parameter includes four parameters in Dolby Digital: "csnroffst" (coarse SNR offset), "fsnroffst" (channel fine SNR offset), "cplfsnroffst" (coupling fine SNR offset), and "lfesfsnroffst" (low frequency effects channel fine SNR offset). These and other Dolby Digital coding parameters are explained further in the A/52 Document cited above. While most of the listed Dolby audio coder parameters are common to the Dolby Digital and Dolby E coding systems and, thus, are explained in the A/52 Document, a few are unique to the Dolby E coding system (e.g., Back gain code (backgain) and Back decay code (backleak)). Further information about backgain and backleak are provided below In the first column of the table shown in FIG. 7, there are four categories of parameters addressed: masking model and bit allocation, coupling between or among channels, temporal noise shaping filter coefficients, and time/frequency transform window. Likewise, in the first column of the table shown in FIG. 8, there are two categories of parameters addressed: frame type and motion control. Further information about listed MPEG audio coder and video coder parameters is set forth in the above-cited ISO/IEC document, MPEG-2 AAC papers, and in other published MPEG documents. Aspects of the present invention are applicable not only to Dolby and MPEG perceptual coding systems, but also to other perceptual coding systems in which parameters in the encoder and/ or decoder may be modulated. Examples of other perceptual coders are discussed in the above-referenced journal article by Brandenburg and Bosi (J. Audio Eng. Soc., 1997).

Modulating Perceptual Hearing Model Parameters

In perceptual audio coding systems, such as Dolby Digital and Dolby E, there are parameters that represent the perceptual hearing model or masking model and are used in the bit allocation process. In particular, certain parameters spectrally model the human ear's masking curve: a downwards masking curve steeply decaying with respect to frequency, an upwards masking curve steeply decaying with respect to frequency, and an upwards masking curve gradually decaying with respect to frequency. These are shown schematically in FIG. 9. Although spectral masking is a frequency domain concept, the standard nomenclature relating to these masking parameters employs time domain terminology ("slow" and "fast", for example).

Figure 9:
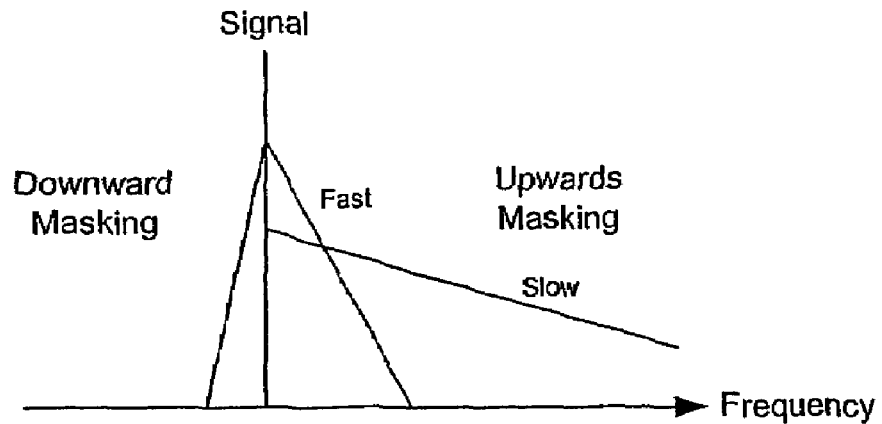
FIG. 9 is a schematic representation of certain parameters that spectrally model the human ear's masking curve (spectral masking model parameters) in certain perceptual audio coders.

Referring to FIG. 9, the coding parameter elements that correspond to the spectral masking model are defined by their level and slope (gain and leak, respectively) with respect to a masking signal as follows:

Downward masking curve: backgain/backleak.
Upwards masking curve (fast): fastgain/fastleak.
Upwards masking curve (slow): slowgain/slowleak.

Note that backgain and backleak are parameters specified in Dolby E coding, but are not parameters specified in Dolby Digital coding. In Dolby Digital, as described in the above-cited A/52 document, the fastgain parameters are the fast gain codes (fgaincod, cplfgaincod and lfegaincod); the fastleak parameters are the fast decay codes (fdcycod and cplfleak); the slowgain parameter is the slow gain code (sgaincod); and the slowleak parameters are the slow delay codes (sdycod and clpsleak).

Figure 10:
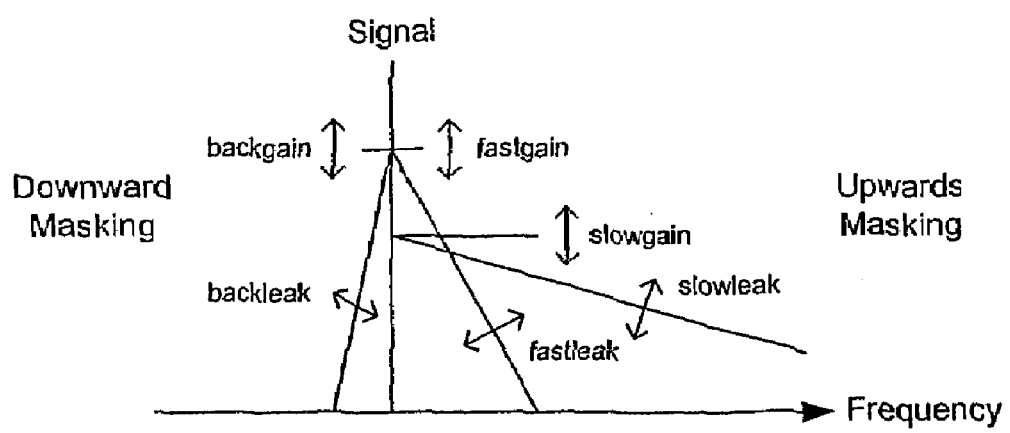
FIG. 10 is a schematic representation of the spectral masking model parameters capable of being modulated in a class of perceptual audio coders.

Each of the parameters defined above is suitable for modulation in order to convey a watermark during perceptual coding. The modulation of any one of them slightly alters the spectral masking model and thus influences the bit allocation process. Thus, the masking model parameters are tightly coupled with the primary input signal so as to make the watermark robust. FIG. 10 provides an illustration of the parameters of the spectral masking model capable of being modulated.

Certain other parameters in the Dolby Digital and Dolby E coding systems control the overall signal-to-noise ratio (SNR). In Dolby Digital these parameters are the SNR offset parameters: csnroffst, fsnroffst, cplfsnroffst, and lfesfsnroffst. The SNR parameters exist to maintain a desired minimum level of signal-to-noise headroom between the signal and the quantization noise. These parameters affect the entire spectrum uniformly, unlike the spectral masking model parameters that primarily affect only a portion of the spectrum relative to a masking signal.

Yet other parameters act as a fine SNR adjustment on a critical band basis, termed "banded SNR", or delta bit allocation: namely, deltba and cpldeltba in Dolby Digital coding.

Figure 11A:
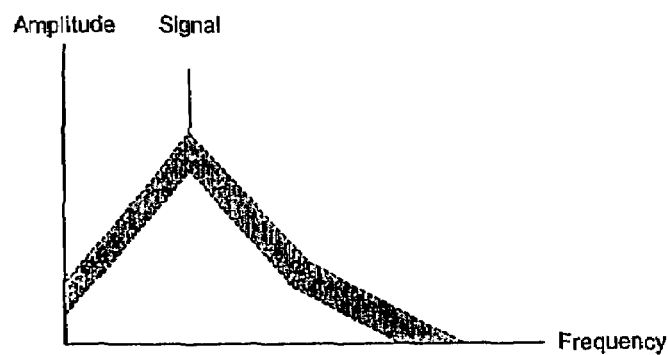
FIG. 11A is an idealized representation showing the modulation of the SNR offset parameter (a masking threshold parameter) in the presence of a sine wave signal in certain perceptual audio coders.
Figure 11B:
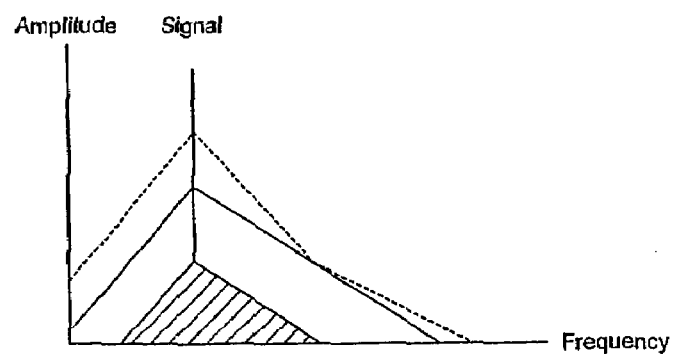
FIG. 11B is an idealized representation showing the effect in the output of the perceptual decoder when the SNR offset parameter is modulated in the manner shown in FIG. 11A for the case of a bit-constrained coding system.
Figure 11C:
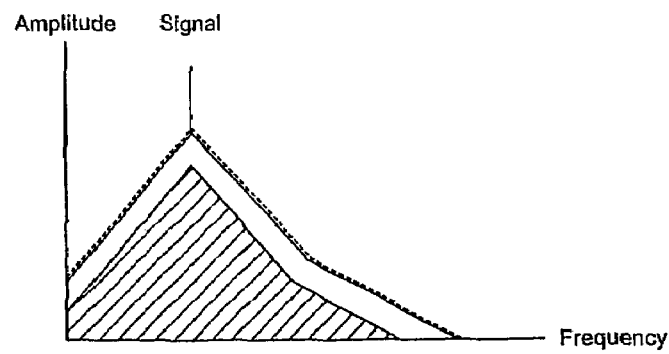
FIG. 11C is an idealized representation showing the effect in the output of the perceptual decoder when the SNR offset parameter is modulated in the manner shown in FIG. 11A for the case of a coding system that is not bit constrained.
Figure 12A:
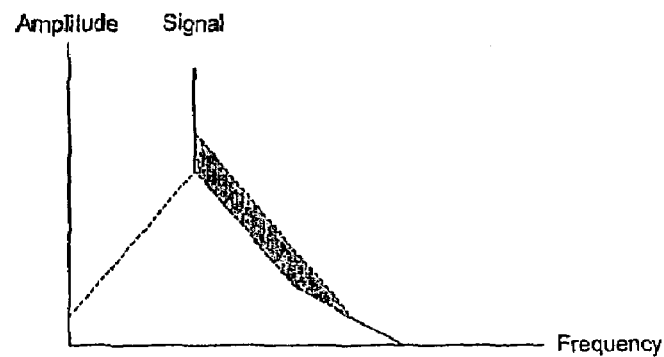
FIG. 12A is an idealized representation showing the modulation of the fast gain code parameter (a masking threshold parameter) in the presence of a sine wave signal in certain perceptual audio coders.
Figure 12B:
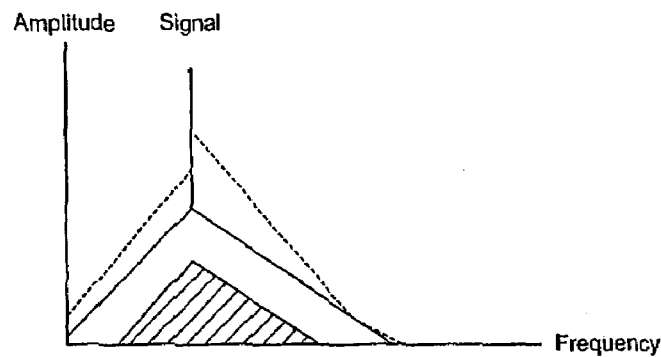
FIG. 12B is an idealized representation showing the effect in the output of the perceptual decoder when the fast gain code parameter is modulated in the manner shown in FIG. 12A for the case of a bit-constrained coding system.
Figure 12C:
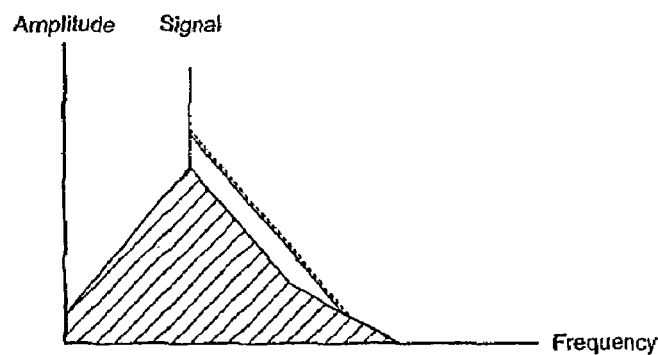
FIG. 12C is an idealized representation showing the effect in the output of the perceptual decoder when the fast gain code parameter is modulated in the manner shown in FIG. 12A for the case of a coding system that is not bit constrained.

FIGS. 11A through 11C and 12A through 12C provide illustrations of modulating a perceptual coding system's masking threshold (modulation of the SNR offset in FIG. 11A and modulation of the fast gain code in FIG. 12A), the resulting effect of the modulation when the coding system is bit-constrained (FIG. 11B and FIG. 12B, respectively), and the resulting effect of the modulation when the coding system is not bit constrained (FIG. 11C and FIG. 12C, respectively). FIG. 11D identifies the legends employed in FIGS. 11A-11C and 12A-12C. Bit-constraints occur when the coder is restricted to producing coded blocks having the same length, which is a requirement of many transmission channels. When the coder is able to vary the number of bits from block to block, there is no effective constraint on the of bits used to represent the signal. As shown (FIGS. 11B and 12B), in a bit-constrained coder, the decoded signal's quantizer error does not exactly match the masking threshold at all frequencies; the example illustrates that more than the necessary bits exist (the gap between the threshold and the decoded signal), resulting in positive margin between the masking threshold and the original quantizer error at some frequencies. Without bit constraints, the coder is able to exactly match the quantizer error to the masking threshold throughout the frequency band. For the default parameter value, the intended watermark symbol may be a bit value of "0". For the modulated parameter value, the intended symbol may be a bit value of "1" as in this example. FIGS. 11A and 12A show the masking threshold before and after modulation. FIGS. 11B, 11C, 12B and 12C show the resulting decoded signal. The modulated masking threshold is overlaid in FIGS. 11/12B and 11C/12C to provide a comparison with the modulated decoded signal spectrum. FIG. 11D shows the legends employed in FIGS. 11A-C and 12A-C.

Modulating Non-Masking Parameters

FIGS. 13 and 14 provide illustrations of the signal characteristics that result from modulating parameters other than masking parameters in Dolby coders. In each of the figures, the signal characteristic is illustrated using a default parameter value and a modulated parameter value. In FIG. 13, the effects of modulating coupling parameters are shown. For each block in time, which is denoted on the horizontal axis, there are illustrated two channels labeled left and right. When the coupling in use flag is "0", each channel is treated independently. When the coupling in use flag is "1", the two channels are combined into a single coupling channel above a certain frequency, denoted by the cplbegf parameter. In addition to the coupling in use flag, the coupling begin frequency may also be modulated, which is also shown in FIG. 13.

In FIG. 14, the effects of modulating the phase flag are illustrated. When the phase flag is equal to "0", the phase is not modified, but if the flag is equal to "1", the phase of the signal is shifted by 180 degrees.

Modulating TDAC Window Parameters

As explained above, perceptual encoders reduce the data rate of an input signal by removing perceptually redundant information. These systems start by decomposing the input signal into one or more components, and then use perceptual analysis to determine how much accuracy each of these components require in order for the difference between the source and coded material to be imperceptible (or to achieve an acceptable level of perceptibility) after the quantized components are decoded. One example of such a system is a transform coder that converts temporal samples to a frequency-based representation using a time-domain aliasing cancellation (TDAC) transform. In order to assure perfect reconstruction, the time-domain samples are processed using overlapping windows prior to transformation. After the transform, the frequency samples are then quantized and encoded in a way that reduces the data rate and are perceptually insignificant upon decode. To maintain perfect reconstruction after the inverse transform process in the decoder, the time-domain samples are windowed, overlapped and added using parameters matched to those that were used in the encoder. Generally, the window parameters for the encode and decode windows are chosen such that when they are applied during the forward and reverse TDAC transforms, aliasing is minimized or removed. Details regarding transform coding using TDAC transforms are set forth in "Analysis/Synthesis Filter Bank Design Based on Time Domain Aliasing Cancellation" by Princen and Bradley IEEE Trans. on Acoustics, Speech, and Signal Processing, Vol. ASSP-34, No. 5, October 1986, pp. 1153-1161, and "Subband/Transform Coding Using Filter Bank Designs Based on Time Domain Aliasing Cancellation" by Princen et al, Proceedings: ICASSP 87, 1987 Intl. Conf. on Acoustics, Speech, and Signal Processing, April, 1987, Dallas, Tex. pp. 2161-2164.

A watermark may be applied by modulating the parameters of a time-domain window used in the construction or reconstruction of the transformed signal. For example, a mismatch between the slope, or alpha ($\alpha$), of the time-domain windows used during encoding and decoding results in time-domain aliasing when using critically sampled transforms. This aliasing results in a unique noise or distortion in both the time and frequency domains. Thus, the window parameter, either in the encoder or the decoder, may be modulated to convey a watermark that is detectable in the encoder output. Distortion, in this sense, is defined as the difference between the coded and original signals, and may or may not result in audible artifacts. In a preferred embodiment, the alpha (slope) values of the time-domain window are modulated. By introducing a noise or distortion signal that is imperceptible but related to and hidden by the source signal, it is extremely difficult to remove or obscure the resulting watermark without creating a perceptible impairment.

Another parameter of the time-domain window that may be changed in order to convey a watermark is the type of window itself. For example, a Kaiser-Bessel Defined window may be used to embed a watermark bit of "0", while a Hanning window may be used to embed a watermark bit of 1. The modulated window change may be done in the encoder or in the decoder.

Additionally, in order to improve detectability and minimize perceptibility, the window parameter may be modulated adaptively in time depending on signal characteristics. For instance, transient signals may obscure the watermark signal, therefore it is advantageous to be able to detect these signals and modulate the window so as to relocate the position of the watermark signal to take advantage of psychoacoustic temporal masking effects. Furthermore, the strength of the modulation and, consequently, the strength of the watermark signal in the decoded signal may be adaptively modified depending on the source signal characteristics. The amount that the window parameters mismatch directly affects the strength of the added distortion. Therefore, the psychoacoustic masking characteristics of the input signal may be analyzed and used to signal the watermark embedding process to vary the amount of the mismatch for a watermark symbol so that it is maximally masked by the signal content.

The direct-form forward TDAC transform equation is given by:

$$X(k) = -2/N \sum_{n=0}^{N-1} x(n)w(n)\cos\left(\frac{2\pi}{N}(k+1/2)(n+n_0)\right), 0 \le k < N/2$$

where
 n=sample number
 k=frequency bin number
 x(n)=input PCM sequence
 w(n)=window sequence
 X(k)=output transform coefficient sequence
 N=total number of samples in the transform
 n0=half of the total number of samples in the transform The TDAC transform window sequences using Kaiser-Bessel defined (KBD) windows can be defined by the following equations:

$$W_{KBD}(n, \alpha, N) = \sqrt{\frac{\sum_{p=0}^{n} W_{KB}(p, \alpha, N)}{\sum_{p=0}^{N/2} W_{KB}(p, \alpha, N)}}$$

where WKB is the Kaiser Bessel kernel window function, defined as:

$$W_{KB}(p, \alpha, N) = \frac{I_0\left[\pi\alpha\sqrt{1-\left(\frac{p-N/4}{N/4}\right)^2}\right]}{I_0(\pi\alpha)}$$

and I0 is the 0th order Bessel function, defined as:

$$I_0(x) = \sum_{k=0}^{\infty}\left[\frac{(x/2)^k}{k!}\right]^2$$

Figure 15:
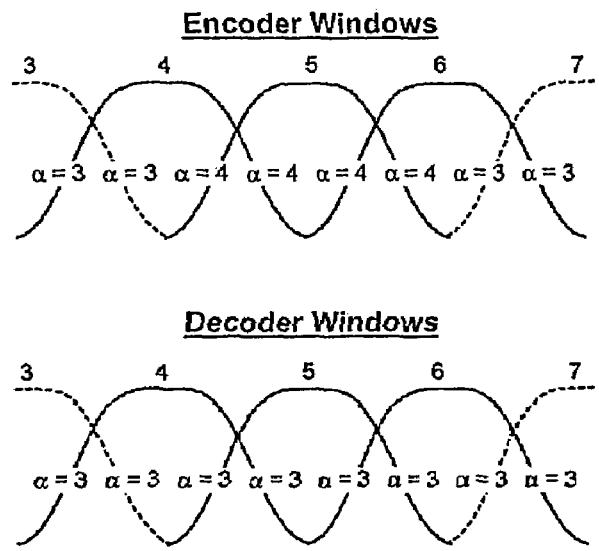
FIG. 15 is a series of idealized waveforms showing time-domain alias window shapes for embedding supplemental information during encoding.

FIG. 15 illustrates five overlapping encoder windows of length 256. The watermark is inserted in the encoding phase by using an α=4 value for window number 5. It should be noted that windows 4 and 6 are hybrid windows that use a combination of α=3 and α=4 windows to provide a smooth transition between the series of α=3 windows and the single α=4 window. In the figure, the decoder windows implement α=3 windows for all transforms. This mismatch in window types introduces time-domain aliasing artifacts in the resulting output signal. The amount of time-domain aliasing introduced into the decoded audio increases as the difference between the encoder α value (α=4) and decoder α value (a=3) increases and exists only in the section of the audio that was processed by encoder window number 5. This method of α alteration does not require decoders to be modified in order to convey watermarked signals and is useful for watermarking at the source of distribution of the signal.

Figure 16:
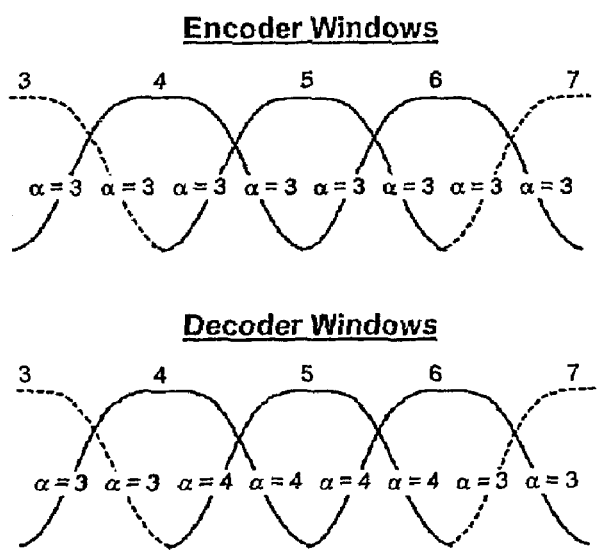
FIG. 16 is a series of idealized waveforms showing time-domain alias window shapes for embedding supplemental information during decoding.

FIG. 16 again illustrates five overlapping windows of length 256, however, in this example, the α window value is altered during the decoding process with inverse TDAC transform windows. Again, time-domain aliasing occurs, injecting a watermark signal into the decoded signal. However, in this example, the embedded signal is injected at the decoder, allowing watermark information to be introduced for a specific end user or device. This α modification allows the decoder to embed serialized information to the signal data.

It may be beneficial to use shorter transform windows when applying the watermark since they reduce the duration of the aliasing distortion and they are generally used during transient conditions (in audio coding). The temporal masking characteristics for the transient signals may be exploited to use values of alpha that more greatly differ from the "correct" value and thereby produce a more robust watermark.

TDAC Window Modulation Detector

By modifying the value of alpha of the TDAC windows, a time-domain aliasing signal is introduced that is related to the coded signal. This aliasing can be measured as the introduction of spectral noise or distortion of the spectral components of the coded signal.

One possible detection method may compare the difference between the source material and the watermarked data as in the manner of the FIG. 4 and FIG. 5 arrangements. This method would search the difference signal for spectral distortion where the watermark modified window was used. If the spectral distortion exceeded a threshold, this would be indicated as a '1' symbol for the watermarked section of data. Spectral distortion below a threshold would be detected as a '0' symbol.

This method is sensitive to wide band noise that may be introduced to mask the watermarked signal. Another detection method is to track spectral peaks of the watermarked signal and look for the amplitude modulation of the frequency bins both before and after the spectral peak that is introduced by time-domain aliasing in the watermarking application. Similar to the general spectral distortion method described below, this detection method would compare the frequency bins surrounding predominant spectral components to a threshold. However, this threshold would be related to the strength of the source signal's spectral component. Spectral side lobes below the threshold would be interpreted as a '0' symbol and spectral side lobes above would be interpreted as a '1' symbol.

Modulating TNS Filter Coefficients

Temporal noise shaping is a coding technology that can help to prevent pre-echo artifacts in perceptual audio coding; it is described in "Enhancing the Performance of Perceptual Audio Coders by Temporal Noise Shaping (TNS)" by Jurgen Herre and James Johnston, 101st AES (Audio Engineering Society) Convention Preprint 4384, Nov. 8-11, 1996. Predictive coding in the frequency domain is used to shape the quantization noise in the time domain. The prediction can help to control where the quantization noise is placed in the time domain. In the case of audio coding, the noise is constrained within the amplitude envelope of the time domain-masking signal to prevent pre-echo. In the case of audio coding, the noise is constrained within the amplitude envelope of the time-domain masking signal to help prevent pre-echo. Pre-echo is an artifact that occurs during transient conditions when the applied frequency transform does not have enough time resolution to prevent quantization noise from occurring before the transient in the output signal.

Although temporal noise shaping (TNS) is a feature of the MPEG-2 AAC perceptual coding system, it may be applied to other systems, such as Dolby Digital, thus providing a further way to modulate parameters in such other systems.

In accordance with this aspect of the present invention, one or more TNS filter parameters are modulated. In particular, the TNS noise shaping filter order and TNS noise shaping filter shape may be modulated, as explained further below.

The TNS process involves the steps of:
1. Decomposing the signal into spectral coefficients by using a time-to-frequency transform,
2. Applying a standard linear-predictor by forming a windowed autocorrelation matrix and using recursion, and
3. If the prediction gain exceeds a certain threshold, a noise-shaping filter is applied to the spectral coefficients.

The invention relies on the properties of the noise-shaping filter that is applied during TNS processing. The spectral-domain filter may be modified in such a way as to shape the noise in any number of different temporal responses. By varying certain parameters of this temporal envelope via spectral-domain filtering, a watermark may be embedded in the signal. In other words, one modulates the noise-shaping filter in the spectral or frequency domain, which thereby changes the quantization noise in the time domain.

Figure 17:
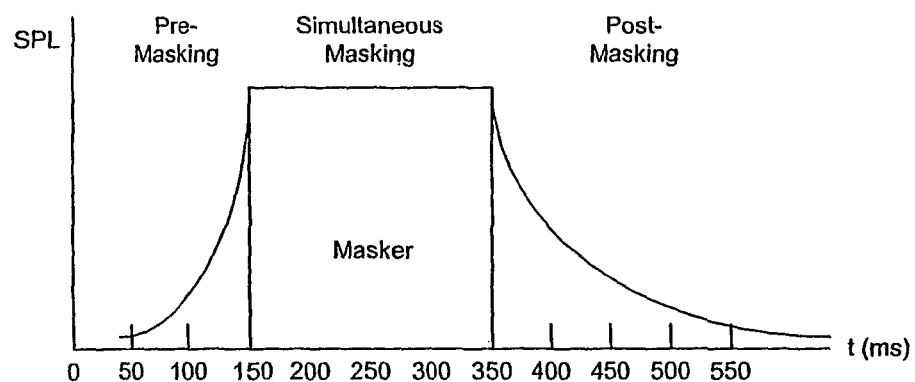
FIG. 17 is an idealized temporal envelope response, plotting sound pressure level (SPL) versus time illustrating the temporal masking effects of a masking signal.

An exemplary temporal envelope response, plotting sound pressure level (SPL) versus time, is illustrated in FIG. 17.

The temporal masking model is quite similar to the spectral masking model used in certain perceptual coders. In particular, the downward and upward envelopes for spectral masking are analogous with the backward and forward temporal masking envelopes. In order to identify more specifically the TNS parameters that may be modulated in accordance with an aspect of the present invention, it is useful to consider in more detail a portion of the operation of the temporal noise shaping process. After decomposing the signal into spectral coefficients by using a time-to-frequency transform, a linear predictive coding (LPC) calculation is performed on the spectral data to determine if the prediction gain exceeds a certain threshold and to derive an envelope of the signal. The prediction coefficients are then computed for each TNS filter for each block as:

$h = Rxx^{-1} \, rxx$ where $rxx\,T = \{Rxx(i,j)\}; Rxx(i,j) = \text{AutoCorr}(|i-j|); i,j=1, 2, \ldots, N$ $rxx' = rxx * \text{win}$ where Rxx is the N-by-N autocorrelation square matrix, N is the TNS prediction order, and h is the vector-optimized prediction coefficients. These equations are based on the well-known orthogonality principle that states that the minimum prediction error is orthogonal to all data used in the prediction.

At initialization time, an autocorrelation matrix window is computed according to the equation:

$$win(i = 0..31) = e^{\left(i+\frac{1}{2}\right)^2 \cdot gaussExp}$$

where $$gaussExp = -\frac{1}{2}\left(\pi \cdot F_{SAMP} \cdot 0.001 \cdot \frac{timeResolution}{transformResolution}\right) transformResolution$$

where
FSAMP=signal sample rate

The timeResolution variable is dependent on the bit rate and number of channels. Likewise, the transform block length defines the transformResolution variable.

The optimal order of the noise-shaping filter is determined by removing reflection coefficients below a certain threshold from the end of the coefficient array. One parameter that may be modulated in order to convey a watermark is the noise shaping filter order. For example, a watermark bit of one sense may be represented by the optimal filter order and a watermark bit of the other sense may be represented by a non-optimal filter order (either lower or higher). Another parameter that may be changed in order to convey a watermark is the shape of the noise shaping filter itself. For example, a watermark bit of one sense may be indicated by using the optimal coefficients determined by the LPC calculation, while a watermark bit of another sense may be indicated by modifying the coefficients, and thus the shape of the noise-shaping filter.

Figure 18:
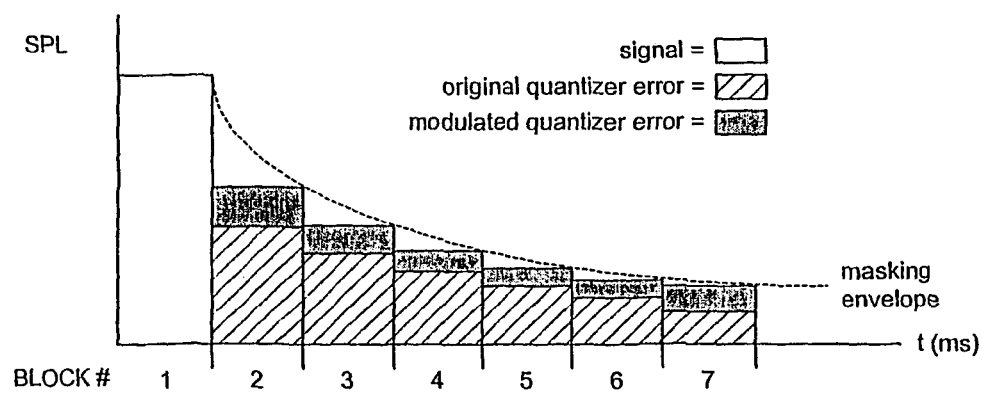
FIG. 18 is an idealized representation showing the type of modulations that can be applied to a signal such that the effects are constrained within a temporal masking envelope.

By modulating the TNS parameters (filter order or filter coefficients), noise is modulated in the temporal envelope of the input signal such that it may be detected in the decoded output signal. FIG. 18 shows an example of a temporal masking envelope and the variability with which the quantizer error may be modulated within that envelope. With each block in time, the TNS parameters may be modulated to convey a watermark.

Practical embodiments of the present invention can provide a very robust watermarking solution. Since the noise that is added by the TNS process is tightly coupled to the envelope of the source signal, it is very difficult to remove or obscure the watermark without degrading the original signal.

The transparency of the watermark described in this invention may be controlled by using an adaptive distortion process of the type described below. In this case, once the temporal envelope of the signal has been modified using TNS, the results are iteratively compared with either a temporal or spectral representation of the temporal masking threshold. If the threshold is exceeded, adjustments are made to the temporal masking parameters and the process is repeated to ensure the desired balance between robustness and perceptibility of the watermarked signal.

The temporal masking characteristics shown in FIG. 18 may be applied to sub-bands of the signal. This allows layering of watermarks along with potentially more locations to embed the watermark.

Modulating Bandwidth

Figure 19:
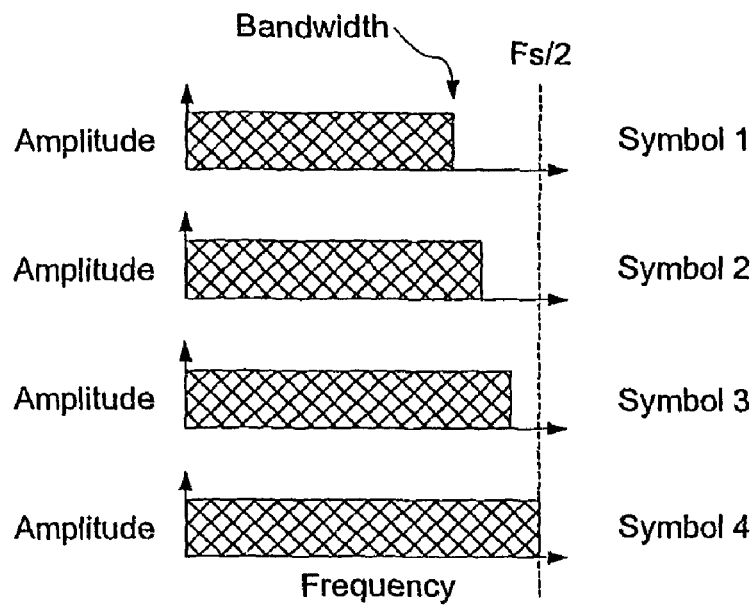
FIG. 19 is a series of idealized amplitude versus frequency plots illustrating how a 2-bit symbol may be represented by four different bandwidths.

It is known that reducing the bandwidth of an audio signal causes minimal degradation to the subjective quality as long as it remains above a minimum level of approximately 16 kHz. Experiments have also shown minimal degradation when the bandwidth is changed dynamically as long as it remains above the minimum level. If the bandwidth is modulated in accordance with a supplemental or watermark signal in the encoder or the decoder, that signal may be derived from the decoded audio. For example, a one-bit code may be embedded in an audio signal where a bandwidth of 16 kHz represents a "0" symbol and a bandwidth of 20 kHz represents a "1" symbol. This can be expanded to multiple bandwidths representing multi-bit symbols creating a higher embedded signal data rate. FIG. 19 illustrates a 2-bit symbol using four different bandwidths. This strategy can be applied where non-robust, inaudible watermarks are required. The inaudible criteria can be achieved as described above. This strategy is non-robust because the watermark can easily be removed by low-pass filtering the decoded audio signal.

Figure 20:
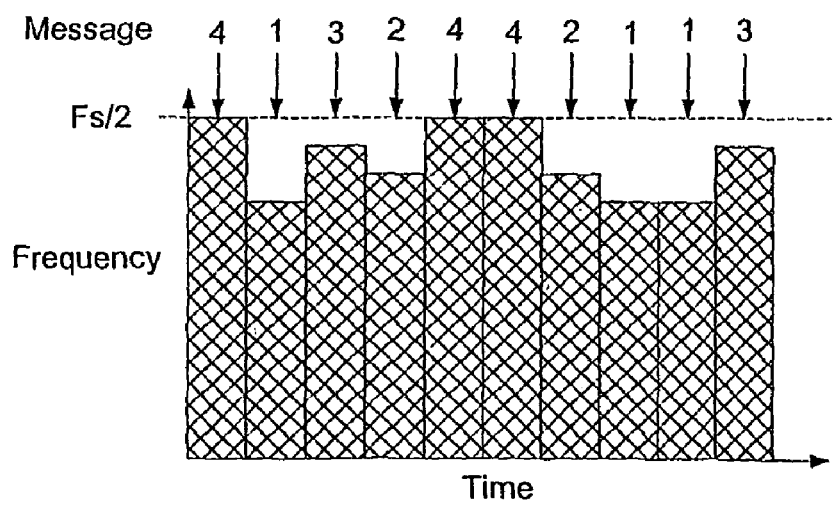
FIG. 20 is an idealized frequency versus time plot showing an example of an audio signal that contains an embedded signal using the bandwidth of the signal to represent different symbols.

FIG. 20 shows an example of an audio signal that contains an embedded signal using the bandwidth of the signal to represent the different symbols.

One problem with the bandwidth watermarking technique described above is that it depends upon the existence of signal content above the minimum bandwidth. For much of the time, signal content above the minimum bandwidth does not exist. A constant embedded signal data rate cannot be attained without high frequency signal content. For example, if the audio signal content consists of a single sine wave at 1 kHz, the only possible way to transmit embedded data in this signal would be to reduce the bandwidth to below 1 kHz. This would be clearly audible and destroy the original signal.

A method that may provide a constant watermark-embedding rate is to ensure that the audio signal contains high frequency energy. One way to achieve this is to add noise to the upper frequencies of the audio signal in such a way that a listener does not perceive it. If the noise added is less than or equal to the human threshold of hearing, it is not perceptible. With the addition of this noise, the embedded signal can use the audio bandwidth as a signaling mechanism that provides a constant data rate. Note that this noise only needs to be added within the signaling band. This signaling band is defined as the band between the lowest frequency and the highest frequency used to place the watermark. The signaling band can be divided into smaller sections where more than two bandwidths are employed to create the watermark.

Figure 21:
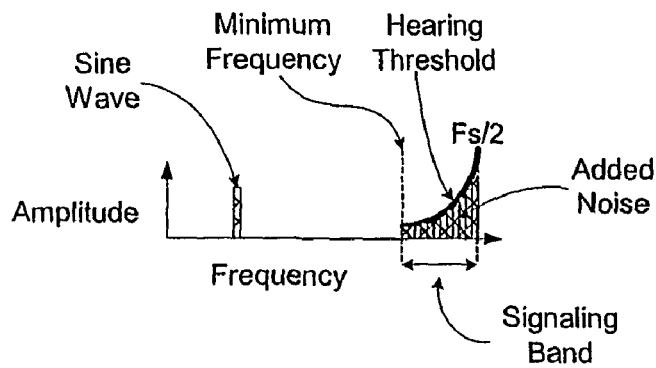
FIG. 21 is an idealized amplitude versus frequency plot illustrating the addition of noise shaped to the approximate level of the human hearing threshold in the presence of a sine wave signal.

FIG. 21 illustrates the addition of the noise shaped to the approximate level of the hearing threshold. It is added to a signal that consists of only a single sine wave and it is added only in the signaling band. The addition of noise into the signaling band does not have to be limited by the hearing threshold but it will probably be audible if the energy were above it. Another dimension of signaling can be added by adjusting the amplitude of the noise below the hearing threshold. For example, additional data may be hidden or inserted if the energy in a region of the signaling band contained more than just an energy state and a no energy state by adding a half energy state. This amplitude signaling would increase the data rate of the embedded signal.

The signal is detectable as long as some signal content is ensured just below the upper bandwidth. It is important that the added signal within the signaling band is similar in each channel. In many cases, these signals are mixed electrically or acoustically and it is important that they do not cancel each other. If in-phase sine waves were added to multiple channels and used for signaling, they would cancel when added acoustically depending upon location. This reduces the reliability of the watermark. Using independent random noise is a better solution because it does not cancel when mixed.

Since signal content may occur in the signaling band and shaped noise is added in the signaling band to guarantee a constant embedding rate, the two signals are added and occasionally increase the energy in the signaling band. This energy variability makes the detection process more difficult. In a preferred embodiment of this aspect of the invention, a low-pass filter is applied to the source signal prior to the addition of the shaped noise to eliminate any source signal interaction in the signaling band.

In the Dolby Digital algorithm or coding process, even if the content in the upper frequency bands is determined to be insignificant, a coarse power spectrum is transmitted in the bitstream that can be used in the decoder to add random noise shaped to the power spectrum. This is a feature of the decoder that is turned on when the dither flag in the bitstream is enabled. The added noise in the decoder recreates the watermark in the decoded audio even if the encoder has judged it perceptually insignificant. The watermark may be inserted during either the encoding or the decoding process.

A Dolby Digital audio coder is capable of generating changes in the bandwidth in accordance with one of two bandwidth parameters (the chbwcod and cplendf codes listed above in the table of FIG. 21). This creates an efficient way of implementing the watermark. However, modulating these codes to generate detectable changes in the decoded signal does put some limitations on the embedded signal data rate:

1. All channels should contain the same bandwidth so that down mixing the signal does not destroy the embedded data. This limits the embedded data rate to the equivalent of a mono channel.
2. For optimal sound quality, the bandwidth code should only be set once per frame, which limits the embedded data rate to the symbol depth and encoded sample rate. If the bandwidth code were changed more than once per frame, the overall sound quality of the coded audio would be reduced.
3. The number of available symbols is limited to the number of available bandwidth codes above the minimum bandwidth.

For example, if the coder is using two different bandwidth states to embed data at 48 kHz the embedded data rate is approximately 31.25 bps. (31.25 frames per second, each containing one bit of information) If it is using four bandwidth states at 48 kHz, the date rate is 62.5 bps. These numbers are derived from the fact that each Dolby Digital frame contains 1536 unique audio sample. If another coder were used that contained 2048 unique audio samples per frame, the data rate would be approximately 23.5 bps for a one-bit code.

The Dolby Digital coder sends an approximation of the power spectral density in the encoder bitstream with each audio frame. It is updated every time there is a significant change in the audio spectrum. The power spectral density information is sent as exponents that are linearly spaced in frequency. In the Dolby Digital decoder, dither is added to any portion of the spectrum that received no quantized information because the signal information was not considered important. The dither, which is essentially random noise, is scaled to the level of the exponent. This adds signal energy to that portion of the spectrum. If the exponents in the signaling band are shaped to less than or equal to the hearing threshold, the dither guarantees signal energy.

The following steps outline the current method of assuring that there is energy in the signaling band within a Dolby Digital encoded signal.

1. Random noise is added above the minimum signaling bandwidth that is shaped to be at or below the hearing threshold. This causes the minimum energy to follow the shape of the hearing threshold.
2. The exponents that are calculated after the noise addition captures this minimum energy level.
3. The decoder recreates the spectral energy from the transmitted exponents even if no bits have been allocated above the minimum signaling bandwidth because dither is usually added. This ensures signal content for the embedded signaling.

The two techniques described above (bandwidth variation and dither) can be used to integrate a low complexity;, fixed bit-rate watermark into a Dolby Digital encoder or decoder. This system is robust against "normal use" of the encode/decode chain that includes down mixing, dynamic range control, volume normalization, matrix surround decoding etc.

Thus, an embodiment of the this aspect of the present invention may include the following steps:

1. Adjusting the bandwidth to embed a hidden data signal.
2. Using a bandwidth code of the Dolby Digital encoding/decoding system to adjust the bandwidth to embed a hidden data signal.
3. Adding noise in the signaling band to ensure signal content can be used to embed data at a constant rate.
4. Shaping this added noise to be less than or equal to the human threshold of hearing to prevent audible perception of the added noise.
5. Adjusting the amplitude of this added noise to add another dimension of signaling to increase the data rate of the embedded signal.
6. The integration of the shaped noise with a Dolby Digital coder to guarantee signal content within the signaling band.

The watermark detector interprets the embedded information contained within the reproduced audio signal. It is preferably capable of extracting the information both electrically and acoustically, but this capability may not be necessary for all applications. Extracting the watermark after acoustic processing is considered a more difficult challenge because of the addition of room noise, speaker and microphone characteristics, and overall playback volume.

The goal of the detector is to determine if there is energy within a given signaling band to find the bandwidth of the audio. This requires a frequency decomposition of the audio that can be calculated by a Fourier transformation, a group of bandpass filters that analyze the signaling band, etc. The energy in each signaling band can be obtained from this signal decomposition. A detector can use this energy information to determine the embedded symbol.

Figure 22:
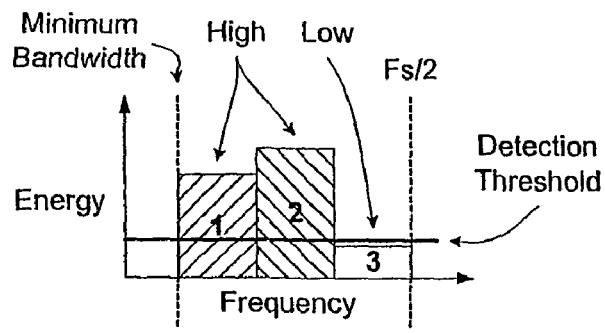
FIG. 22 is an idealized energy versus frequency plot showing three different energy levels required for detecting four different bandwidths that create a 2-bit symbol.

One possible detection method applies a fixed threshold comparison in each signaling band to determine the encoded symbol. This threshold may be set at the energy level just above the noise floor. Anything above this level would be considered to contain signal level. FIG. 22 shows three different energy levels required for detecting four different bandwidths that create a 2-bit symbol. Any energy above the detection threshold is considered 'high' and anything below is considered 'low'.

This fixed threshold only works well in a closed environment where the noise floor of the system is always known and the peak signal levels are never attenuated. For example, if any other noise were added to the noise floor in the above diagram, the third energy level would be considered 'high' and an incorrect symbol would be interpreted.

It is possible to use a fixed threshold if the energy levels are equalized or normalized before the threshold calculation. One technique that would accomplish this applies an AGC algorithm or process to the signaling band before the energy levels are determined. These levels are normalized by the AGC so that the 'low' and 'high' levels become more consistent. A fixed threshold can be applied in this case because of the normalization of the levels.

Figure 23:
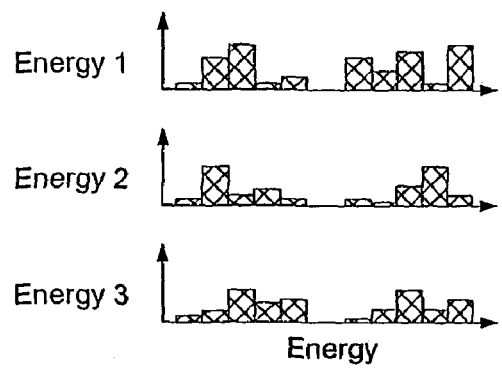
FIG. 23 is an idealized amplitude versus energy plot showing several example histograms of the distribution of 'high' and 'low' states.

An adaptive threshold is thought to be best for any environment where the noise levels and the signal energy are constantly changing. One possible detection method that employs an adaptive threshold uses the previous energy states to calculate a threshold for the current state. This detector works on the premise that in a finite number of the previous states for a given energy band, there should exist some energy levels that are in a 'high' state and some that are in a 'low' state. The largest energies may be considered 'high' while the smallest may be considered 'low'. These 'high' and 'low' states can be considered to be two different groups. FIG. 23 contains several example histograms of the distribution of 'high' and 'low' states. A threshold may be determined that lies somewhere between these two 'clusters'.

If the number of 'high' states is assumed to be equal to the number of 'low' states in the previous finite set, the largest half belongs to the 'high' group while the smallest half belongs to the 'low' group. If the average energy level of mean is found for each group, a simple threshold can be calculated as the average of these two means. This can easily become more complicated by assuming different distributions for the two groups and thresholds that take into consideration more of each groups statistics like mean and variance.

Another consideration may be included that improves the separation into 'high' and 'low' groups. When more than two bandwidths are included in the embedding process, the energy levels in the signaling bands are dependent. When the highest bandwidth is 'on', all the energy levels in each signaling band should be detected as 'high'. When the second highest bandwidth is 'on', all the signaling levels below this bandwidth should be detected as 'high'. This alters the distribution of the energy levels for each signaling band.

For example, assume that the watermark encoder is generating a two-bit symbol using four different bandwidths. Let A, B, C and D represent the bandwidths where A is the lowest bandwidth and D is the highest. Three different energy bands are required to determine these bandwidths. Let these three energy bands be represented by 1, 2, and 3, which are the energy between bandwidths A-B, B-C and C-D respectively. The following table lists the probability for each energy bands to be in a 'high' state if the symbols are uniformly distributed.

| Energy Band | P('high') |
| --- | --- |
| 1 | ¾ |
| 2 | ½ |
| 3 | ¼ |

The probabilities are not equal because of the dependence of each energy band on the bandwidth. For example, the probability of signal content in energy band 1 is the sum of the probabilities of the B, C and D symbols of occurring. Each symbol has a probability of ¼ of occurring; hence, the probability of signal content in energy band 1 is ¾.

If the previous forty states were used to calculate the current threshold for each energy band, the highest thirty states would be assumed to represent signal content within energy band 1. The remaining ten samples would represent no signal content. The current threshold for this case is determined by finding the average of the means between these two groups.

The addition of channel coding to ensure that the symbol distribution is substantially uniform is essential for this detector. If the encoder entered a symbol that was just the highest bandwidth for an extended period, this detector would have difficulty decoding the embedded data. The closer the symbol distribution is to the assumed probability, the more accurate the detection of the embedded data is.

One possible channel coding method is to ensure that each symbol occurs only once over a finite period. For example, if there are four different bandwidth codes, each symbol may be required to occur once in a group of four symbols. This generates 24 unique symbols that are groups of four bandwidth codes. 24 (four factorial) is the maximum number of permutations of the four bandwidth codes. If A, B, C and D represent the four bandwidth codes, the symbols would look like ABCD, BACD, ABDC, BADC, BCAD, etc. Note that this reduces the embedded data rate.

Thus, a watermark detector according to this aspect of the present invention may include 1. An embedded signal detector that uses an adaptive threshold that is calculated by examining previous states. The previous states are separated into groups based on energy level. The threshold is based on statistics of the each group that try to separate the groups as much as possible.
2. When multiple groups are involved, the number of elements in the groups is adjusted based on dependencies from the bandwidth adjustment.
3. A channel coder that ensures that the distribution of the symbols is close to uniform over a finite time. This ensures that the watermark detector described above functions properly.

Controlling Strength of the Parameter Modulation Adaptive Distortion Control One goal of the present invention is to embed a watermark having maximized detectability and minimized perceptibility. Perceptual encoders use a threshold of perceptibility to determine how to reduce the redundancy of an input signal. This same threshold can be used to adjust the watermark signal in a way that is detectable while remaining substantially imperceptible.

As mentioned above, in Some perceptual encoders, a distortion measurement is paired with the rate control to ensure that the current information is discarded. A distortion measurement compares the original input signal with the encoded signal (output of the rate control). The distortion measure may be useful to control some of the coding parameters to change the outcome of the rate control process. This may create a nested loop structure, described below, in which the outer loop contains a distortion measure and the inner loop is the rate control. Modifications are made iteratively to the coding parameters by examining the distortion measurement until some criteria are met. The same approach may be applied to variable data rate encoders, by removing the rate loop.

Figure 24:
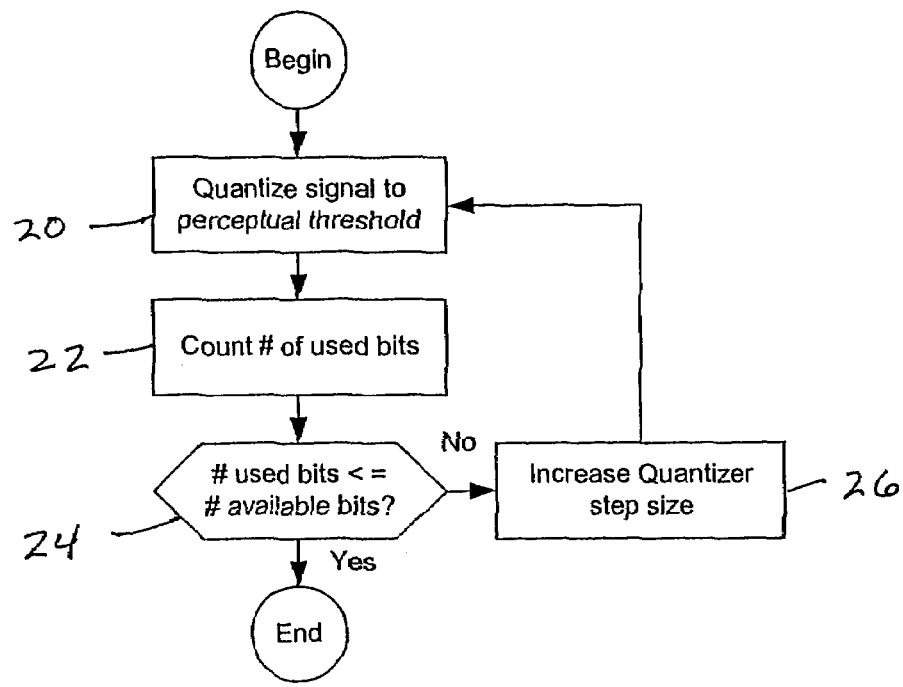
FIGS. 24-26 are logic flow diagrams showing a process for embedding a watermark using a threshold of perceptibility.
Figure 25:
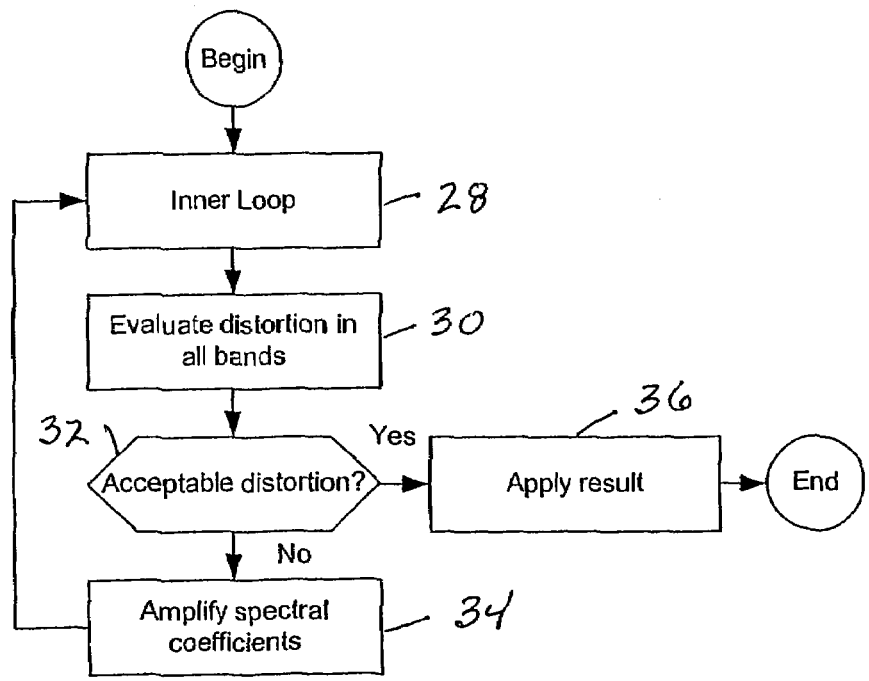
Figure 26:
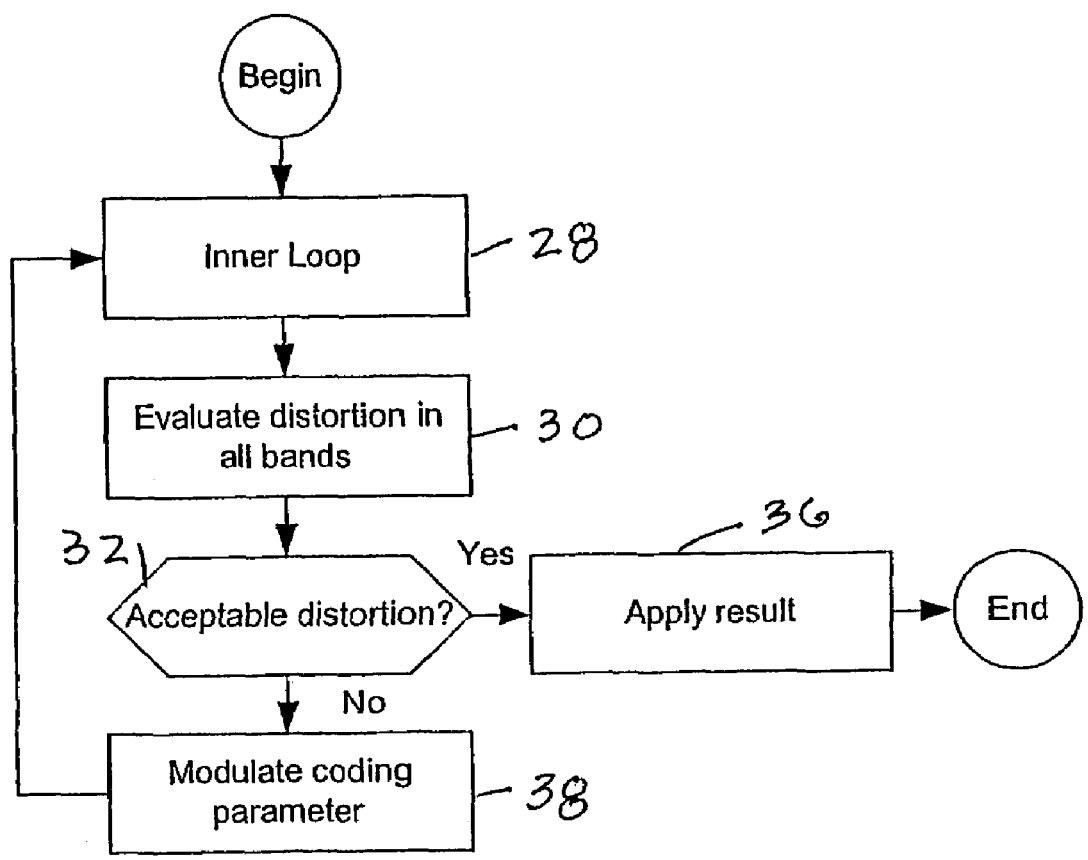

The process for embedding a watermark using a threshold of perceptibility according to an aspect of the present invention is shown in FIGS. 24-26. This process is similar to that defined in the MPEG-2 AAC perceptual coder in which two nested loops are used to determine the optimal quantization. The inner iteration loop, shown in FIG. 24, modifies the quantizer step size until the spectral data can be coded with the number of available bits (rate control). The outer iteration loop, shown in FIG. 25, amplifies the spectral coefficients in all spectral bands in a way that the demands of the psychoacoustic model are fulfilled as much as possible (distortion control). The process of FIG. 25 is modified by modulating a perceptual coding parameter or parameters (shown in FIG. 26) to fulfill the psychoacoustic model, or perceptual threshold, as much as possible while also embedding a watermark signal. All of the parameters listed in the tables of FIGS. 6, 7 and 8 may be modulated in this way, although, some parameters are more difficult than others to change during the bit allocation process.

The rate control process in FIG. 24 attempts to represent the signal by a smaller fixed amount of information. The input signal is quantized according to the perceptual threshold (step 20) and the bits used as a result of the quantization are counted (step 22). If the number of used bits does not exceed the available bits, then the process is finished (step 24). Alternatively, the iterative process continues until the number of bits used matches as closely as possible the number of available bits. This is usually accomplished by adjusting the perceptual threshold, via quantizer step size modifications, until enough information has been discarded (step 26).

A distortion measuring process, shown in FIG. 25, may be added to the quantizer step size process to ensure that some of the simplifications of the rate control encoding process have not caused errors that are easily perceived. The distortion measure allows fine-tuning of coding parameters to minimize such errors. In the first step of the process, the rate loop, or inner loop, is performed to quantize the input signal according to a rate constraint (step 28). Then a distortion evaluation calculates how much distortion exists (step 30) and determines whether the distortion is acceptable relative to a perceptual threshold (step 32). If the distortion is not acceptable, the spectral coefficients are amplified (step 34) and the process is repeated. If the distortion is acceptable, the result of the quantization is applied to the input signal (step 36) and the process is completed. "Distortion", in this sense, is the difference between the coded and original signals, and may or may not result in audible artifacts.

In aspects of the present invention, a distortion measure process, shown in FIG. 26, is used to determine the amount that a coding parameter value may be varied from its default value when modulated and yet stay within the bounds of the perceptual threshold. This maximizes the possible detection of the watermark because it preferably causes as much distortion as possible, constrained by the perceptual threshold, without the distortion being perceptible. The rate control (step 28), distortion control (step 32), and coding parameter adjustment (step 38) steps are repeated until an acceptable compromise is made.

Certain coding systems, such as Dolby Digital, use a rate control process during encoding but do not apply distortion control. Therefore, in order for such coding systems to employ this aspect the invention, a distortion measure is added. Other coders, such as MPEG-2 AAC, already have the distortion control process integrated for the purposes of coding and with minor modifications may be used also to apply a watermark according to this aspect of the present invention. It should be noted that in variable-rate coding systems, the rate loop is not required, thus providing an optimal solution to the parameter modulation process while also reducing complexity.

Figure 27:
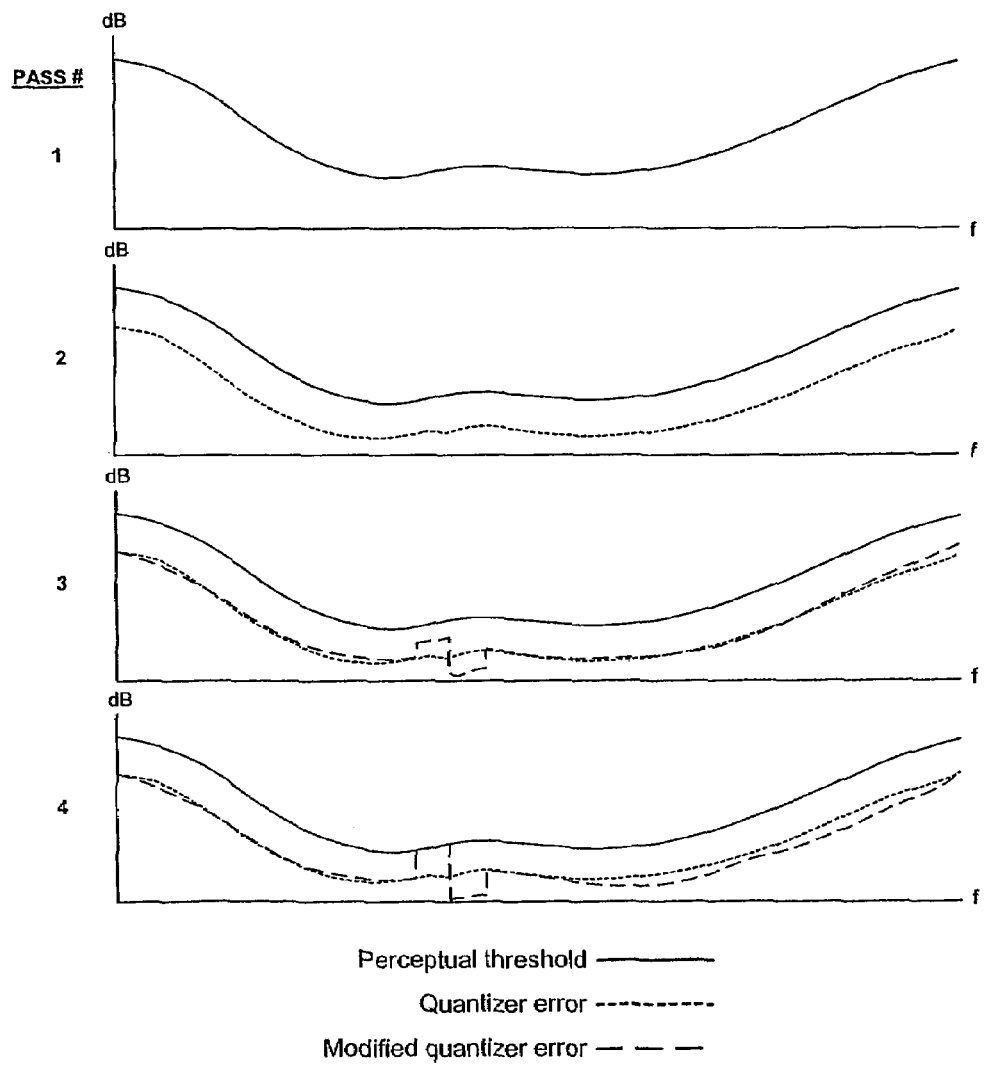
FIG. 27 shows a series of idealized waveforms depicting, across a frequency spectrum, the perceptual threshold, quantizer error and modified quantizer error, illustrating how a watermark may be embedded using a distortion measuring process for the case of modulating a parameter that affects quantizer error within a critical band.

FIG. 27 illustrates how a watermark may be embedded according to the present invention using a distortion measuring process of the type just described. Preferably, The goal is to maximize robustness by forcing the effect of the modulated parameter, which is illustrated as the change in quantizer error in pass 2, as close to the perceptual threshold as possible. In the first pass, the perceptual threshold is calculated. In the second pass, the quantizer error is shown. Note that there is some margin available with which to modify the quantizer error imperceptibly. In pass 3, the chosen watermark coding parameter, in this example the delta bit allocation type of parameter (i.e., the deltba or cpldeltba parameters, which affect the quantizer error within a critical band), has been adjusted and results in a modified quantizer error. The quantizer error may be modified even further and still remain imperceptible. Note that the modulation of the coding parameter results in a slightly different quantization error over the entire spectrum because the number of bits available is affected. This illustrates that modulation of coding parameters, and resulting quantizer resolution in certain bands, causes error in the entire spectrum, not only the band in which the parameter is modulated. In pass 4, the degree of modulation of the coding parameter has been adjusted again using information from pass 3 and the resulting quantizer error is as close as possible to the perceptual threshold. Although it is preferred to bring the quantizer error as close as possible to, but below, the perceptual threshold, when modulating one or more parameters that affect quantizer error, the invention also contemplates the modulation of one or more parameters such that the quantizer error is below but not close to the perceptual threshold, as for example in pass 3 of FIG. 27.

Figure 28:
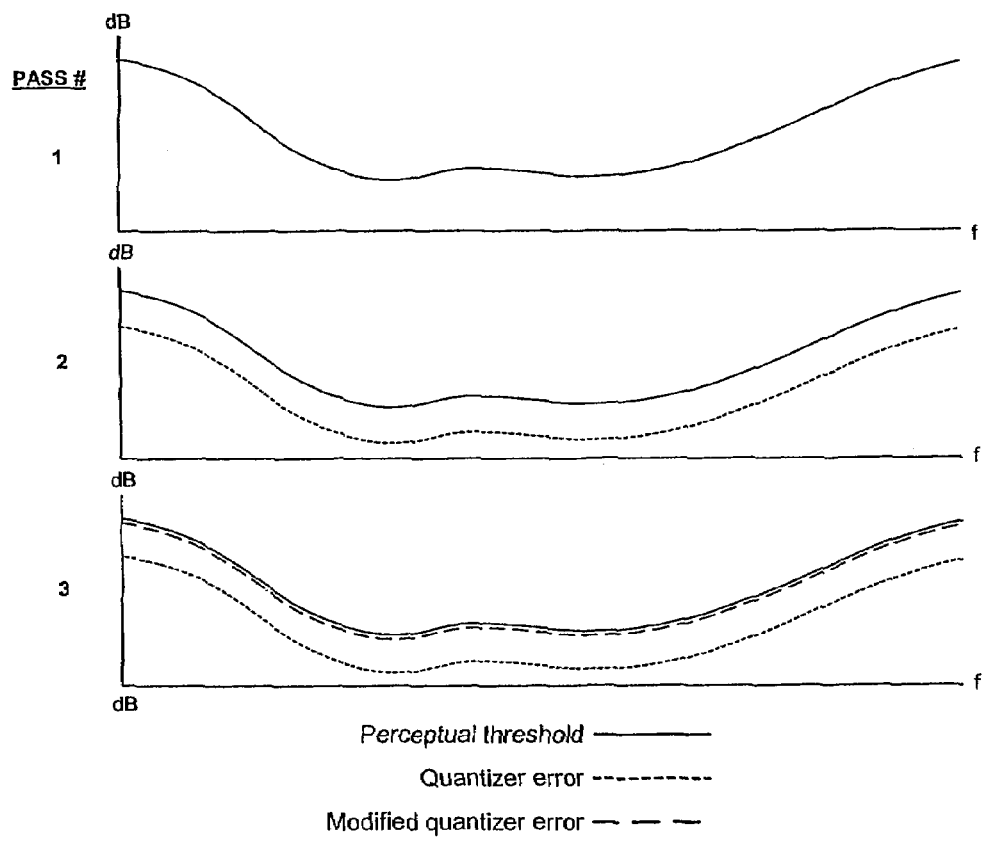
FIG. 28 shows a series of idealized waveforms depicting, across a frequency spectrum, the perceptual threshold, quantizer error and modified quantizer error, illustrating how a watermark may be embedded using a distortion measuring process for the case of modulating a parameter that affects signal to noise ratio offset throughout the frequency spectrum.

FIG. 28 illustrates the watermark embedding process wherein the chosen watermark coding parameter is the overall SNR offset type of parameter (i.e., the csnroffst, fsnroffst, cplfsnroffst or lfesfsnroffst parameters). Note that in this example, modulation of the overall SNR offset parameter results in an exact match to the perceptual threshold. This is because the SNR offset type of parameter is a uniform offset of the perceptual threshold throughout the frequency spectrum. Accordingly, the process of adapting the quantizer error to the perceptual threshold using the SNR offset type of parameter requires only one step.

A further facet of this aspect of the present invention allows a user to control the offset of the perceptual threshold that controls the possible 'gain' or energy of the watermark. This may be a linear offset to the perceptual threshold or a more complicated function that allows more distortion in specific bands. This allows a user to control the ease of detection and the audibility of the final embedded signal. This may be accomplished by raising the perceptual threshold curve by a fixed amount. Furthermore, by modifying the perceptual threshold, the user may embed a watermark where the watermark coding margin is negative.

In perceptual coders, such as Dolby Digital, Dolby E, and MPEG-2 AAC coders, the quantization, or bit allocation, process is computed based on the number of bits available to the coder and the overall signal-to-noise ratio. Next, the perceptual threshold is compared to the quantizer error. If the distortion (difference between perceptual threshold and quantizer error) does not meet the completion requirements, the chosen coding parameter modulation is modified based on the distortion and the process is repeated until the distortion is acceptable.

In a preferred embodiment of this aspect of the invention, the distortion is computed from groups of banded coefficients (i.e., grouped by critical bands) that form the basis of the perceptual threshold. It should be noted that the perceptual threshold might also be based on the quantization error of individual spectral coefficients at the sacrifice of increased complexity.

Once the threshold is established, the distortion control portion of this aspect of the invention begins. The coding parameter under test is modulated in accordance with subsequent iterations of the distortion process. The modulation of the encoding parameter affects the result of the bit-allocation of the spectral bands performed in the rate control process. The resulting threshold of the bit allocation is compared with the original perceptual threshold and the coding parameter is modulated iteratively until the completion requirements are met. If the requirements for completion are not met, the masking threshold is reformulated using the modulated parameter.

In a preferred embodiment of this aspect of the invention, the termination of the adaptive distortion process may occur when the perceptual threshold and the masking threshold are equivalent for any given band of interest and none of the bands of the masking threshold exceed the perceptual threshold. If the perceptual and masking thresholds never converge, further termination logic may be employed as long as the masking threshold does not exceed the perceptual threshold. Termination requirements exist in order to constrain complexity.

Decoder Parameter Modulation

Figure 29:
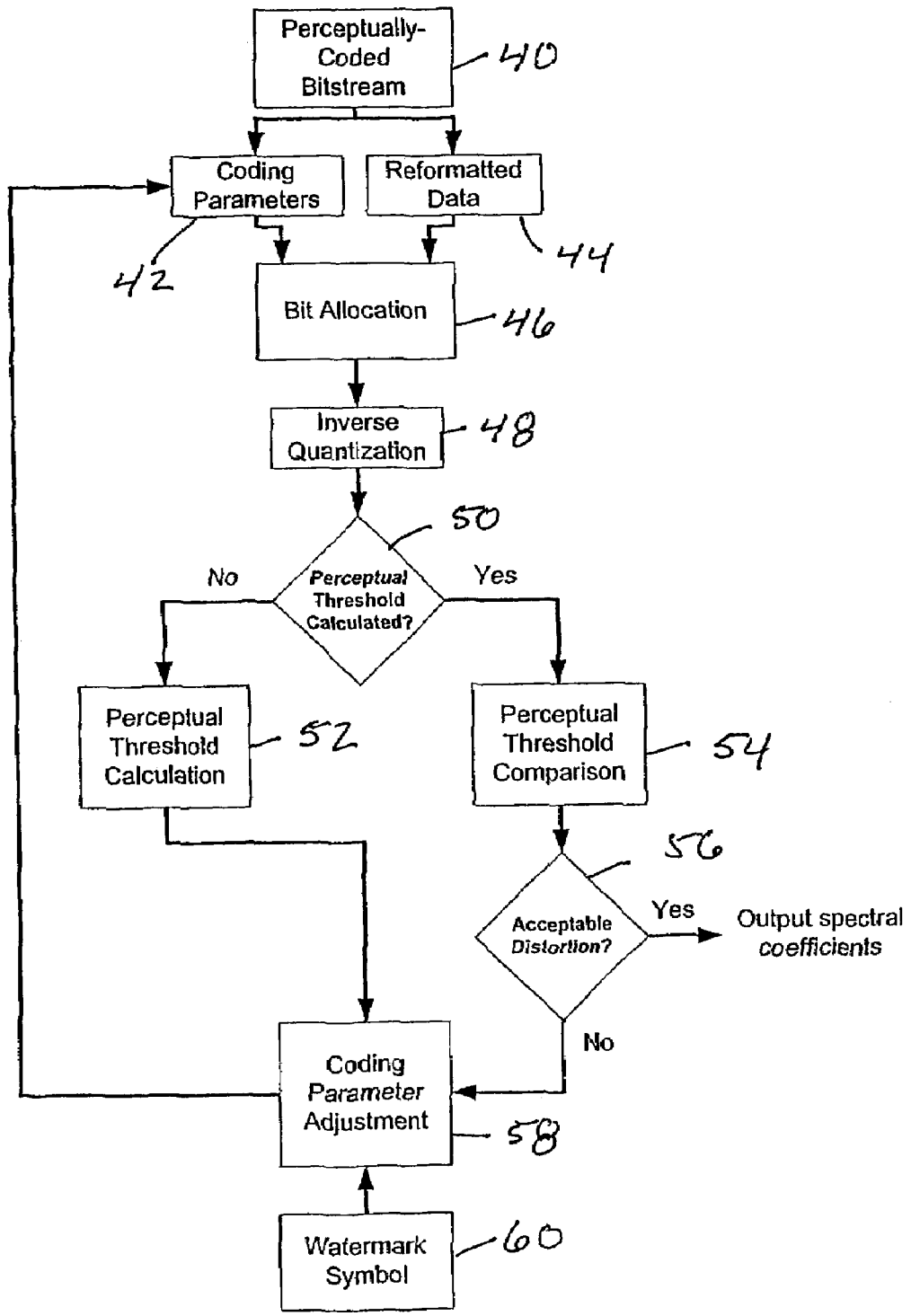
FIG. 29 is a logic flow diagram, illustrating the steps of a process of embedding a watermark during decoding, in accordance with aspects of the present invention.

FIG. 29 shows an aspect of the present invention in which the parameters of a perceptual audio decoder are modulated. In this example, the decoder employs a hybrid bit allocation (i.e., a perceptual model is conveyed from the encoder to the decoder). The received perceptually coded bitstream 40 is separated in the decoder into coding parameters 42 (representing the bit allocation model) and reformatted data 44 (i.e., the quantized data). Bit allocation 46 and inverse quantization 48 are performed. In the next step 50, a decision is made (Perceptual Threshold Calculated?). If not computed already (i.e., the first time through the loop), a perceptual threshold is calculated (step 52) based on the signal from the coded bitstream. If the perceptual threshold exists (i.e., after the first time through the loop), a comparison is made (step 54) between the inverse quantized signal and the threshold. Next, a decision is made (Acceptable Distortion?) in step 56. If the resulting distortion is acceptable (i.e., meets predefined termination requirements), then the process is complete and spectral coefficients are outputted to other functions in the decoder. If the distortion is not acceptable, the coding parameter being modulated is adjusted (step 58) and the process of bit allocation, inverse quantization, and perceptual threshold comparison are repeated. The coding parameter is initially modulated based on the watermark symbol (i.e., supplemental information) input 60 and is subsequently adjusted based on the perceptual threshold comparison.

A similar process may be employed in a perceptual audio decoder system employing a forward-adaptive bit allocation (i.e., a perceptual model is created in the encoder and explicitly sent to the decoder). The signal data is reformatted using the transmitted perceptual model. This perceptual model can then be modified by a parameter to embed a watermark. The watermarked version of the audio is compared to the unmarked signal. If the distortion measurement does not meet the specified, predefined completion requirement(s); the signal is reformulated using a modified parameter modulation value.

Figure 30:
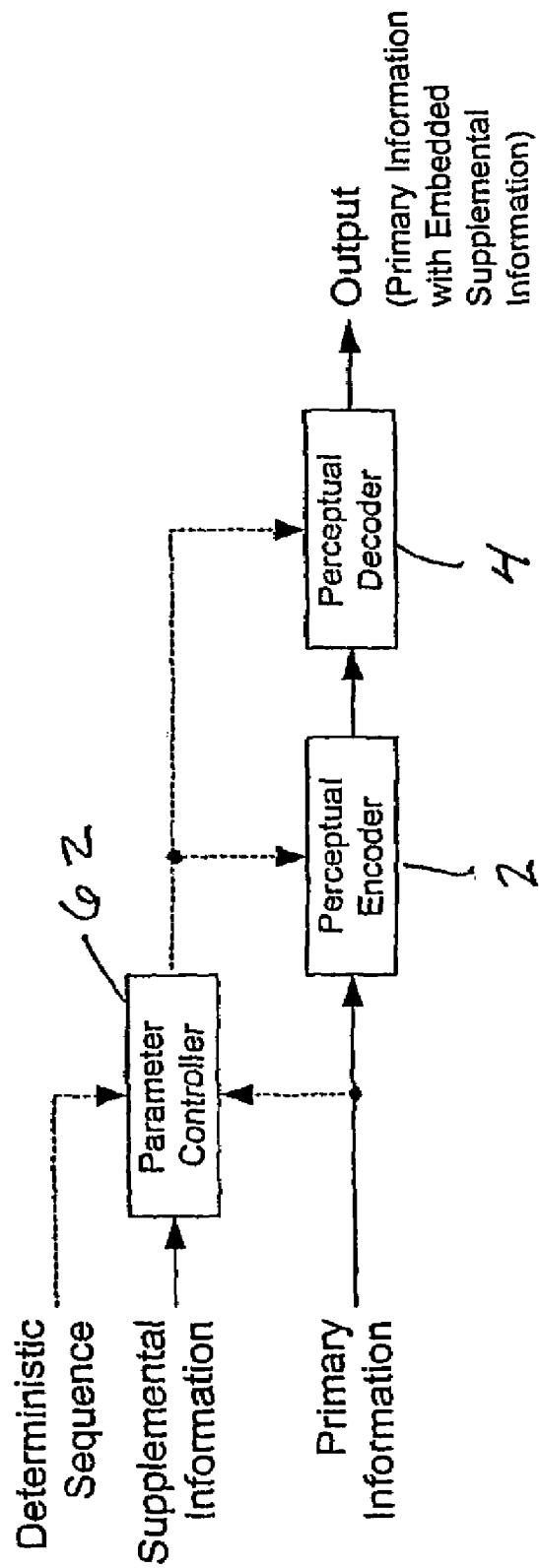
FIG. 30 is a functional block diagram showing other aspects of the invention in which control of the modulation by the supplemental information of watermark is modified by a function of one or more other signals or data sequences including, for example, a deterministic sequence and/or the input signal applied to the coding system.

Controlling Parameter Modulation in Response to a Watermark Sequence and/or a Deterministic Sequence In other aspects of the invention, modulation of one or more parameters is controlled indirectly by the supplemental information or watermark signal or sequence. For example, control of the modulation by the watermark is modified by a function of one or more other signals or data sequences including, for example, a set of instructions such as a deterministic sequence and/or the input signal applied to the coding system. FIG. 30 is a functional block diagram showing this aspect of the invention. As in the basic arrangement of FIG. 2, primary information is applied to a perceptual encoder function 2 that generates a digital bitstream that is received by a perceptual decoder function 4. In this aspect of the invention, the supplemental information is applied to a parameter controller function 62. The parameter controller function 62 also receives the primary information or one or more deterministic sequences or both the primary information and one or more deterministic sequences. The parameter controller 62 modifies the way in which secondary information modulates encoder function or decoder function parameters. It does so by modifying one or more sets of secondary information each with either a function of the primary information and/or a function of one or more deterministic sequences as next described. Because modified supplemental information from the parameter controller function may be applied either to the encoder function or to the decoder function or to both, dashed lines are shown from the supplemental information to the encoder function and to the decoder function, respectively. As in the case of the FIG. 2 arrangement, the output of the perceptual decoder function is primary information with embedded supplemental information. The supplemental information may be detectable in the decoder function output, If modified supplemental information controls parameter modulation in both the encoder function 2 and the decoder function 4, typically, the information applied to one will be different from that applied to the other. For example, the supplemental information controlling the one or more encoder function parameters might represent a watermark identifying the owner of the audio or video content and the supplemental information controlling the one or more decoder function parameters might be a serial number identifying the equipment that presents the audio or video content to one or more consumers.

When the parameter controller 62 employs a deterministic sequence to modify the manner in which the supplemental information modulates one or more parameters, detection of the supplemental information or watermark in the decoder function output requires the generator equation and the key of the deterministic sequence to be known by the detector function. The generator equation may be known publicly, may be known a priori by the detector (but not publicly), or may be communicated to the detector via a secure channel. Similarly, the key may be known publicly, may be known a priori by the detector (but not publicly), or may be communicated to the detector via a secure channel. For the system to be secure, the only requirement is that the key not be publicly disclosed.

When the parameter controller 62 employs the input signal to modify the manner in which the supplemental information modulates one or more parameters, detection of the supplemental information or watermark in the decoder function output requires the source signal or at least certain information about the source signal (e.g., the characteristics of the source signal that the parameter controller is programmed to respond to) to be known by the detector function. This may be done by communicating the source signal or, preferably, the characteristics of the source signal that the parameter controller is programmed to respond to, to the detector function. If the source signal, rather than the relevant characteristics of the source signal that the parameter controller is programmed to respond to, to the detector relevant characteristics independently based on an analysis of the source signal and the decoder function output. However, errors may occur because the characteristics are originally determined based on the source signal with no quantizer error.

Controlling Parameter Modulation in Response to a Deterministic Sequence

Modifying the Rate of Watermark Symbol Transitions

One variation of this aspect of the present invention involves controlling, with a deterministic sequence, the rate of parameter modulation state transitions, and, consequently, the rate of watermark symbol transitions. In particular, it involves varying, in response to the deterministic sequence, the duration of the parameter modulation states and, consequently, the duration of the watermark symbol rates. If watermark symbols transitions are embedded at a constant rate, repetitive sequences in the watermark symbol pattern may be perceptible. By modifying the duration of the parameter modulation states and, consequently, the duration of the symbol, repetitive effects may be minimized. Table 1 shows an example in which the duration of the parameter modulation state and, consequently, the duration of the watermark symbol, is dependent on a deterministic sequence, thus resulting in the pattern shown as the modified sequence. In this particular example the watermark sequence is repeated if the deterministic sequence value is equal to "1". If the DS has a value of "0", the watermark symbol is not repeated. It should be noted that the period of the watermark symbol pattern increases based on the occurrences of the value of "1" in the deterministic sequence. Accordingly, a finite sequence should be used that resets appropriately so that synchronization is possible during detection.

TABLE 1

| Sequence Type | Sequence |
| --- | --- |
| Deterministic sequence (DS) | 10110010 |
| Watermark sequence (WS) | 01011100 |
| Modified sequence | 001001111000 |

Selecting the Parameter for Embedding the Watermark

In accordance with a further variation of this aspect of the invention a deterministic sequence selects the parameter or parameters used to embed the watermark. Generally, it is possible to employ any one of several parameters to embed a watermark. For example, the modulation of one parameter may result in a spectral energy modification in a particular frequency range and the modulation of another parameter results in a reduction in bandwidth of the decoded signal. If only one parameter is modulated, the resulting watermark may be more perceptible to a person with acute sensitivity to spectral energy modulation. On the other hand, if the embedding technique that is used switches between modulating one parameter and modulating another, the resulting watermark may be less perceptible. As the number of watermark embedding parameters increases, this effect becomes more pronounced (the impairment introduced by the watermark is more noise-like).

Table 2 illustrates two ways in which coding parameters may be selected for modulation. In the first example, shown in part "a" of Table 2, parameters 1 and 2 take on the value of the watermark sequence (WS) depending on the deterministic sequence (DS). For example, parameter 1 is modulated to a state reflecting the WS value if the DS value is "0", otherwise it is modulated to a state reflecting a "0" value (either state may be, but need not be, the parameter's default value). Accordingly, parameter 2 is modulated to a state reflecting the WS value if the DS value is 1, otherwise it is modulated to a state reflecting a "0" value (either state may be, but need not be, the parameter's default value). The sequences from both parameters and from the DS are required to detect the WS in this example. In the second example, shown in part "b" of Table 2, parameters 1 and 2 are modulated to a state reflecting the value of the WS depending only on the WS itself. For example, parameter 1 is modulated from its default state to a state reflecting a WS value of "0" and parameter 2 is modulated from its default state to a state reflecting a WS value of "1". In this way, either parameter may be detected independently, as they both convey the WS.

TABLE 2

| | Sequence Type | Sequence |
| --- | --- | --- |
| | Deterministic sequence (DS) | 10110010 |
| | Watermark sequence (WS) | 01011100 |
| a | Parameter 1 = WS, DS (0) | 01001100 |
| | Parameter 2 = WS, DS (1) | 00010000 |

TABLE 2-continued

| Sequence Type | | Sequence |
|---|---|---|
| b | Parameter 1 = 1, WS (0) | 10100011 |
|   | Parameter 2 = 1, WS (1) | 01011100 |

Modifying the Rate at Which the Choice of Parameters for Modulation Changes

According to a further variation of this aspect of the invention, the choice of parameters for modulation may change depending on a deterministic sequence. This may further reduce perceptibility of the watermark, as periodic effects introduced by changing the embedding technique at a constant rate are eliminated. This embodiment is illustrated in Table 3. In this example, parameter 1 is modulated to a state reflecting the inverse of the WS (either state may be, but need not be, the parameter's default value) and the symbol repeats when the DS value is "1" and otherwise it is not repeated. Parameter 2 is modulated to a state reflecting the default value of the WS (either state may be, but need not be, the parameter's default value) and the symbol repeats when the DS value is "1" and otherwise it is not repeated. As in the example of part b of Table 2, both parameters convey the watermark.

TABLE 3

| Sequence Type | | Sequence |
|---|---|---|
| Deterministic sequence (DS) | | 10110010 |
| Watermark sequence (WS) | | 01011100 |
| Modified sequence (rate of technique transitions) | Parameter 1 = (WS), DS (0) | 110110000110 |
| | Parameter 2 = WS, DS (1) | 001001111001 |

Controlling Parameter Modulation in Response to the Characteristics of the Source Signal

Modifying the Rate of Watermark Symbol Transitions Using Source Signal Analysis Another variation of this aspect of the invention involves analyzing the characteristics of the source signal, and then adaptively controlling the rate of parameter modulation transitions and, consequently the rate of watermark symbol transitions based on the results of this analysis. In particular, it involves varying, in response to characteristics of the source signal, the duration of the parameter modulation states and, consequently, the duration of the watermark symbol states. For example, rapidly changing signal conditions may provide a useful degree of temporal masking that may be used to lessen the perceptibility of a watermark symbol transition. If the amplitude of the time-domain source signal varies beyond a pre-determined threshold from frame 1 to frame 2 (assuming that the source signal has been formatted into a digital signal stream having frames), the watermark symbol may be allowed to change from one value in frame 1 to another value in frame 2. In frame 3, if the characteristic of the source signal does not vary beyond the threshold from the previous frame(s), the symbol may not be permitted to change values. By correlating watermark symbol transitions to masking events or other "change-friendly" conditions in the underlying source signal, imperceptibility of the watermark may be improved.

In Table 4, a source-defined sequence (SDS) represents the output of a thresholding process, such as transient detection. For this example, an SDS value of "0" indicates that no transient condition occurred and a value of "1" indicates that a transient was present in the block. In part "a" of Table 4, the WS value is repeated (by repeating the same modulation state of the parameter) if the SDS has a value of "1". If the SDS has a value of "0", the watermark symbol is not repeated. In this example, it is assumed that a single coding parameter conveys the watermark.

Modifying the Rate at Which the Choice of Parameters for Modulation Changes Using Source Signal Analysis In another aspect of the invention, the just-explained aspect is modified so as to use the characteristics of the source signal to modify the rate at which the choice of parameters for modulation changes, as opposed to the rate of parameter modulation. As in the just-explained aspect, the benefit is that the transitions are less perceptible if they occur when the source signal provides temporal masking or other "change-friendly" conditions. An example of this embodiment is illustrated in part b of Table 4. In this example, parameter 1 is modulated to a state reflecting the inverse of the WS (either state may be, but need not be, the parameter's default value) and the symbol repeats when the SDS value is "1" and otherwise it is not repeated. Parameter 2 is modulated to a state reflecting the default value of the WS (either state may be, but need not be, the parameter's default value) and the symbol repeats when the SDS value is "1" and otherwise it is not repeated. As in the example of part b of Table 2, both parameters convey the watermark. This approach is similar to that shown in Table 3, but differs only in that the transition rate is here defined by the SDS.

TABLE 4

| Sequence Type | | Sequence |
|---|---|---|
| | Signal-defined sequence (SDS) | 00101110 |
| | Watermark sequence (WS) | 01011100 |
| a | Modified sequence (rate of symbol transitions) | Parameter 1 | 010011111000 |
| b | Modified sequence (rate of technique transitions) | Parameter 1 =- (WS), SDS (0) | 101100000111 |
| | | Parameter 2 = WS, SDS (1) | 010011111000 |

Selecting the Parameter for Embedding the Watermark Using Source Signal Analysis In another aspect of the present invention, the number of parameters in the available set of parameters available for modulation is modified based on characteristics of the source signal. Suppose a particular watermarking system is able to embed a watermark by modulating any of several different parameters (e.g., parameters resulting in spectral energy boost, temporal noise insertion, bandwidth reduction, etc.). Depending on the current characteristics of the source signal, not all of these parameters may cause imperceptible changes in the decoded signal. For example, if the source signal is stationary, temporal noise insertion may be more perceptible than a spectral energy boost in a frequency range that is perceptually masked. As a result, it may be beneficial to reduce the available set of parameters to disallow those that are likely to cause results that are more perceptible for the current signal characteristic.

In Table 5, an example shows a signal-defined sequence (SDS) based on the same thresholding process (transient detection) as described previously. An SDS value of "1" indicates that a transient condition exists in the block and an SDS value of "0" indicates that no transient condition exists. In Table 5, parameters 1 and 2 nominally convey the watermark when no transient condition exists (SDS=0), with parameter 1 having a modulation state reflecting a value of "1" for WM values of "0" and having a modulation state reflecting a value of "0" otherwise and parameter 2 having a modulation state reflecting a value of "1" for WM values of "1" and having a modulation state reflecting a value of "0" otherwise. If a transient condition exists (SDS=1), then parameters 3 and 4 are modulated, which parameters optimally cause temporal distortion, instead of parameters 1 and 2, which cause spectral distortion. Having reduced the number of parameters, a deterministic sequence may then be used to select parameters from the smaller set, thereby preserving the benefit of switching between or among parameters, while at the same time adaptively choosing among parameters that are preferable in view of current source signal characteristics.

TABLE 5

| Sequence Type | Sequence |
| --- | --- |
| Signal-defined sequence (SDS) | 00101110 |
| Watermark sequence (WS) | 01011100 |
| Parameter 1 = 1, WS (0), SDS (0) | 10000001 |
| Parameter 2 = 1, WS (1), SDS (0) | 01010000 |
| Parameter 3 = 1, WS (0), SDS (1) | 00100010 |
| Parameter 4 = 1, WS (1), SDS (1) | 00001100 |

Controlling Parameter Modulation in Response to a Deterministic Sequence and the Characteristics of the Source Signal In addition to controlling parameter modulation using only a deterministic sequence or only characteristics of the input signal, the invention also contemplates controlling parameter modulation in response to both a deterministic sequence and characteristics of the input signal.

There are multiple ways to combine the use of a deterministic sequence and the source signal characteristics in order to control parameter modulation. Doing so may further improve imperceptibility and/or robustness. In one such method, a deterministic sequence selects which subset of coding parameters is used for different states of the signal characteristics. More particularly, using the example of Table 5 above, the first two parameters are chosen for modulation when a transient does not exist (SDS=0) and those parameters are chosen based on a deterministic sequence, DS. Table 6 illustrates this method.

TABLE 6

| Sequence Type | Sequence |
| --- | --- |
| Signal-defined sequence (SDS) | 00101110 |
| Deterministic sequence (DS) | 10110010 |
| Watermark sequence (WS) | 01011100 |
| Parameter 1 = 1, SDS (0), DS (0), WS (0) | 00000001 |
| Parameter 2 = 1, SDS (0), DS (0), WS (1) | 01000000 |
| Parameter 3 = 1, SDS (0), DS (1), WS (0) | 10000000 |
| Parameter 4 = 1, SDS (0), DS (1), WS (1) | 00010000 |
| Parameter 5 = 1, SDS (1), DS (0), WS (0) | 00000000 |
| Parameter 6 = 1, SDS (1), DS (0), WS (1) | 00001100 |
| Parameter 7 = 1, SDS (1), DS (1), WS (0) | 00100010 |
| Parameter 8 = 1, SDS (1), DS (1), WS (1) | 00000000 |

In another example, the deterministic sequence modifies the rate of transitions of the watermark sequences that are modified by a signal-defined sequence. Table 7 illustrates this method. The second column illustrates the first step of altering the embedding technique based on the SDS and the third column illustrates the second step of further altering the rate of the sequences based on the DS. As in previous examples, the sequence value is repeated if the SDS has a value of "1". If the SDS has a value of "0", the sequence value is not repeated.

TABLE 7

| Sequence Type | Sequence (DS) | Sequence (DS/SS) |
| --- | --- | --- |
| Signal-defined sequence (SDS) | 00101110 | |
| Deterministic sequence (DS) | 10110010 | |
| Watermark sequence (WS) | 01011100 | |
| Parameter 1 = 1, WS (0), SDS (0) | 10000001 | 110000000001 |
| Parameter 2 = 1, WS (1), SDS (0) | 01010000 | 001001100000 |
| Parameter 3 = 1, WS (0), SDS (1) | 00100010 | 000110000110 |
| Parameter 4 = 1, WS (1), SDS (1) | 00001100 | 000000011000 |

With each of the examples in which multiple coding parameters convey the embedded sequence, there also exists the possibility of adding redundancy by applying the same watermarking sequence to multiple coding parameters to increase error resiliency to attack or processing. To facilitate lower-complexity detection, such coding parameters may have constrained relationships, or a predetermined hierarchy, such that if one parameter has errors the detector may be able to recover the message from another coding parameter.

Additionally, a deterministic sequence may be used to modulate simultaneously one or more other coding parameters to make it difficult for an attacker to deduce which parameter is carrying the watermark. In an example shown in Table 8, parameter 1 conveys the watermark sequence and the deterministic sequence specifies which of parameter 2 or parameter 3 will vary based on the watermark sequence. Parameters 2 and 3 in this case do not carry the watermark, but act as decoys. In this example, the decoy parameters will equal the WS for the appropriate state of the DS, and will be "0" otherwise.

TABLE 8

| Sequence Type | Sequence |
| --- | --- |
| Deterministic sequence (DS) | 10110010 |
| Watermark sequence (WS) | 01011100 |
| Parameter 1 = WS | 01011100 |
| Parameter 2 = WS, DS (0) | 01001100 |
| Parameter 3 = WS, DS (1) | 00010000 |

CONCLUSION

It should be understood that implementation of other variations and modifications of the invention and its various aspects will be apparent to those skilled in the art, and that the invention is not limited by these specific embodiments described. It is therefore contemplated to cover by the present invention any and all modifications, variations, or equivalents that fall within the true spirit and scope of the basic underlying principles disclosed and claimed herein.

The present invention and its various aspects may be implemented as software functions performed in digital signal processors, programmed general-purpose digital computers, and/or special purpose digital computers. Interfaces between analog and digital signal streams may be performed in appropriate hardware and/or as functions in software and/or firmware.

The invention claimed is:

1. A method of modifying the operation of the encoder function and/or the decoder function of a perceptual coding system in accordance with supplemental information so that the supplemental information may be detectable in the output of the decoder function, comprising
modulating one or more parameters in said encoder function and/or said decoder function in response to the information content of said supplemental information.

2. A method according to claim 1 wherein said perceptual coder is an audio coder of the type that employs a hybrid forward/backward bit allocation.

3. A method according to claim 2 wherein said one or more parameters include one or more parameters that fall within one or more of the following categories:
masking model and bit allocation,
coupling between or among channels,
frequency bandwidth,
dither control,
phase relationship, and
time/frequency transform window.

4. A method according to claim 1 wherein said perceptual coder is an audio coder of the type that employs a forward bit allocation.

5. A method according to claim 4 wherein said one or more parameters include one or more parameters that fall within one or more of the following categories:
masking model and bit allocation,
coupling between or among channels,
temporal noise shaping filter coefficients, and
time/frequency transform window.

6. A method according to claim 1 wherein said perceptual coder is a video coder and wherein said one or more parameters include one or more parameters that fall within one or more of the following categories:
frame type, and
motion control.

7. A method according to claim 1 wherein said one or more parameters are selected from the parameters that affect in the decoded output signal one or more of:
signal-to-noise ratio,
quantizer noise,
time relationship between or among channels,
frequency bandwidth,
shaped noise,
phase relationship between or among channels, and
wide spectrum, time-aliasing noise.

8. A method according to claim 1 wherein said one or more parameters are modulated by performing one of the following acts:
varying a two valued parameter between its two values,
varying the parameter between or among its default value and one or more other values, and
varying the parameter between or among values other than its default value.

9. A method according to claim 1 wherein the degree of modulation of said one or more parameters is controlled.

10. A method according to claim 9 wherein the degree of modulation of said one or more parameters is controlled to limit the perceptibility of artifacts in the decoded output signal resulting from the modulation of said one or more parameters.

11. A method according to claim 1 wherein the modulation of a parameter is indirectly controlled in accordance with supplemental information such that one or more of the following modulation characteristics:
the selection of one or more parameters for modulation,
the rate of parameter selection, and
the rate of parameter state transitions
is determined in response to supplemental information and as a function of one or more other signals or sequences.

12. A method according to claim 11 wherein said one or more other signals or sequences includes either or both of the following:
a set of instructions, and
characteristics of the input signal to the encoder of the coding system.

13. A method according to claim 12 wherein said set of instructions include a deterministic sequence.

14. A method according to claim 13 wherein said deterministic sequence is a pseudo-random-number sequence.

15. A method according to claim 1 wherein said one or more parameters are modulated in said encoder function.

16. A method according to claim 1 wherein said one or more parameters are modulated in said decoder function.

17. A method according to claim 1 wherein said one or more parameters are modulated in said encoder function and in said decoder function.

18. A method for modifying the operation of the encoder and/or the decoder of a perceptual coding system in accordance with supplemental information and for detecting the supplemental information in the output of the decoder according to claim 1, further comprising
detecting the supplemental information in the output of the decoder function.

19. A method according to claim 18 wherein the act of detecting the supplemental information in the output of the decoder function is accomplished by one of the following acts:
observing the decoded signal,
comparing the decoded signal to the signal applied to the encoder function, and
comparing the decoded signal to the decoded signal from a substantially identical perceptual coding system in which no parameters in the encoder function or decoder function are modulated in response to supplemental information.

20. A method according to claim 19 wherein the act of observing the decoded signal comprises comparing the decoded signal to a time delayed version of itself.

21. A method according to claim 1 wherein one or more perceptual coding parameters are modulated in response to said supplemental information.

* * * * *